US009613158B1

(12) United States Patent
Lepeska

(10) Patent No.: US 9,613,158 B1
(45) Date of Patent: Apr. 4, 2017

(54) CACHE HINTING SYSTEMS

(71) Applicant: VIASAT, INC., Carlsbad, CA (US)

(72) Inventor: Peter Lepeska, Boston, MA (US)

(73) Assignee: ViaSat, Inc., Carlsbad, CA (US)

( * ) Notice: Subject to any disclaimer, the term of this patent is extended or adjusted under 35 U.S.C. 154(b) by 235 days.

(21) Appl. No.: 14/276,936

(22) Filed: May 13, 2014

(51) Int. Cl.
G06F 15/16 (2006.01)
G06F 17/30 (2006.01)
H04L 29/06 (2006.01)
H04L 29/08 (2006.01)

(52) U.S. Cl.
CPC ...... *G06F 17/30902* (2013.01); *H04L 67/104* (2013.01); *H04L 67/2842* (2013.01); *H04L 67/2847* (2013.01); *H04L 67/42* (2013.01); *G06F 2212/6028* (2013.01)

(58) Field of Classification Search
CPC .............. H04L 67/104; H04L 67/2847; H04L 67/2842; G06F 2212/6028; G06F 17/30902
USPC ........................................................ 709/203
See application file for complete search history.

(56) References Cited

U.S. PATENT DOCUMENTS

| 6,085,193 | A * | 7/2000 | Malkin | G06F 17/30902 |
| 6,351,767 | B1 * | 2/2002 | Batchelder | G06F 17/30902 707/E17.12 |
| 6,622,168 | B1 * | 9/2003 | Datta | G06F 17/30902 707/E17.12 |
| 8,255,456 | B2 * | 8/2012 | Sundarrajan | H04L 67/28 709/203 |
| 8,301,697 | B2 * | 10/2012 | Sethi | G06Q 10/10 348/14.08 |
| 8,583,763 | B1 * | 11/2013 | Kim | G06F 21/53 709/218 |
| 9,021,048 | B2 * | 4/2015 | Luna | H04L 67/22 709/213 |
| 9,043,428 | B2 * | 5/2015 | Lobo | H04L 67/2842 709/201 |
| 9,129,033 | B1 * | 9/2015 | Jenkins | G06F 12/0815 |
| 9,135,364 | B1 * | 9/2015 | Sundaram | G06F 17/30902 |
| 9,332,084 | B2 * | 5/2016 | Kim | H04L 67/2842 |
| 2002/0026563 | A1 * | 2/2002 | Chamberlain | G06F 17/30902 711/138 |
| 2003/0187917 | A1 * | 10/2003 | Cohen | H04L 67/1095 709/203 |
| 2003/0187935 | A1 * | 10/2003 | Agarwalla | H04L 29/06 709/206 |
| 2003/0188021 | A1 * | 10/2003 | Challenger | G06F 17/30896 709/246 |
| 2003/0188106 | A1 * | 10/2003 | Cohen | H04L 67/1095 711/133 |
| 2003/0191800 | A1 * | 10/2003 | Challenger | G06F 17/30902 709/203 |

(Continued)

Primary Examiner — Imad Hussain
(74) Attorney, Agent, or Firm — Kilpatrick Townsend & Stockton LLP

(57) ABSTRACT

The present invention relates to systems, apparatus, and methods for improving web transactions using cache hints. In various embodiments, cache hints may be information for optimizing and extending the use of cached objects based on web transaction information from system users. This may enable indirect updates to caching directives, and may allow a proxy to respond to If-None-Match or If-Modified-Since requests using information from cache hints instead of prefetched information from a content provider.

33 Claims, 14 Drawing Sheets

(56) References Cited

U.S. PATENT DOCUMENTS

| | | | | |
|---|---|---|---|---|
| 2003/0191812 A1* | 10/2003 | Agarwalla | G06F 17/30902 | 709/217 |
| 2005/0210121 A1* | 9/2005 | Taylor | H04L 67/2847 | 709/218 |
| 2006/0075068 A1* | 4/2006 | Kasriel | G06F 17/30902 | 709/217 |
| 2007/0156852 A1* | 7/2007 | Sundarrajan | G06F 17/30902 | 709/219 |
| 2007/0156965 A1* | 7/2007 | Sundarrajan | H04L 67/42 | 711/133 |
| 2009/0100228 A1* | 4/2009 | Lepeska | G06F 17/30902 | 711/125 |
| 2009/0106381 A1* | 4/2009 | Kasriel | G06F 17/30902 | 709/206 |
| 2009/0182941 A1* | 7/2009 | Turk | G06F 12/0862 | 711/118 |
| 2010/0005046 A1* | 1/2010 | Segel | H04L 67/28 | 706/46 |
| 2010/0085943 A1* | 4/2010 | Reid | H04W 72/085 | 370/332 |
| 2010/0191805 A1* | 7/2010 | Lu | H04L 67/2842 | 709/203 |
| 2010/0281224 A1* | 11/2010 | Ho | G06F 17/30902 | 711/137 |
| 2010/0332586 A1* | 12/2010 | Jogand-Coulomb | H04L 67/2847 | 709/203 |
| 2011/0099247 A1* | 4/2011 | Copeland | H04L 12/66 | 709/217 |
| 2011/0213800 A1* | 9/2011 | Saros | G06Q 30/02 | 707/769 |
| 2011/0238921 A1* | 9/2011 | Allen | G06F 12/0862 | 711/137 |
| 2012/0096106 A1* | 4/2012 | Blumofe | G06Q 50/00 | 709/213 |
| 2012/0246257 A1* | 9/2012 | Brown | G06F 17/30902 | 709/213 |
| 2013/0080577 A1* | 3/2013 | Taylor | H04L 67/02 | 709/217 |
| 2013/0124621 A1* | 5/2013 | Lepeska | G06F 17/30902 | 709/203 |
| 2014/0006538 A1* | 1/2014 | Oikonomou | H04L 67/2847 | 709/213 |
| 2014/0019577 A1* | 1/2014 | Lobo | H04L 67/2842 | 709/213 |
| 2014/0052927 A1* | 2/2014 | McCauley | G06F 12/0862 | 711/137 |
| 2014/0059156 A1* | 2/2014 | Freeman, II | H04L 67/10 | 709/213 |
| 2014/0089467 A1* | 3/2014 | Beck | H04L 67/02 | 709/219 |
| 2014/0095804 A1* | 4/2014 | Lientz | H04L 67/06 | 711/144 |
| 2014/0189071 A1* | 7/2014 | Leighton | H04L 67/2847 | 709/219 |
| 2014/0379840 A1* | 12/2014 | Dao | H04L 67/2847 | 709/213 |
| 2015/0019686 A1* | 1/2015 | Backholm | H04L 47/32 | 709/217 |
| 2015/0120821 A1* | 4/2015 | Bendell | H04L 67/2842 | 709/203 |
| 2015/0180992 A1* | 6/2015 | Thibeault | H04L 67/24 | 709/201 |
| 2015/0295988 A1* | 10/2015 | Goodwin | H04L 67/1095 | 709/203 |
| 2015/0304384 A1* | 10/2015 | Lee | H04L 67/02 | 709/203 |
| 2015/0379157 A1* | 12/2015 | Brown | G06F 17/30902 | 709/213 |

* cited by examiner

CACHE HINTING SYSTEMS

BACKGROUND

Web page transmission, in which a user selects web page content and receives objects, is a core part of the Internet experience for Internet users. While the experience of users is typically a single selection followed by the viewing of a web page that is presented on the screen, the process of presenting the web page on the screen can involve a large number of objects and multiple request/response round-trip communications from the user system to a system that is providing the web page.

One method of improving the performance of web page transmission and presentation is the caching of previously downloaded object for reuse in a later web page transaction. Since significant amounts of network traffic involve repeated communication of the same information, local caching of objects is one way to optimize network communications. Another method of improving the performance of web page transmission involves prefetching which may be applied to hypertext transport protocol (HTTP) communications. HTTP prefetching involves pre-requesting content on behalf of a client or browser before a request for that content is actually generated as a typical HTTP request and response in the course of a typical web page transaction. Certain prefetching embodiments involve pre-requesting content based on predictions about a future user selection without any actual action or selection by the user. Other HTTP prefetching systems, such as the systems discussed here, involve pre-requesting content in response to a user action or selection as part of a web page transaction. In such systems, when content is prefetched, it may become possible to satisfy the request for that content locally (with regard to the client or browser) or at a location with a lower latency to the user, thereby negating the need to transmit the request and wait for the response from a content server. For example, in cases where there exists high latency between the client generating the request and the server which responds with the context requested, each negated request/response may avoid the penalty for such latency, thereby potentially reducing the total time required to satisfy the entire series of requests for the client. This may result in an accelerated end user experience.

In some caching and prefetching systems, the system may have a set of metrics for determining when a file should or should not be prefetched, and when the files may be stored in cache and for how long. Such systems may create errors or fail to identify certain areas for optimization. For example, under certain circumstances, incorrect objects may be prefetched repeatedly based on incorrect models, or it may be difficult to quantify exceptions to a rule, resulting in resources being wasted to prefetch an object that will never be used. In other systems, rules related to the freshness of cache objects may involve the re-communication of an object which is already in a cache. This may also simply involve revalidation of the object where a check is made to see if the object is still fresh, which requires a round trip communication. Systems and methods described herein may function to improve issues related to the time associated with rendering a web page through improved caching with a cache hinting system.

BRIEF DESCRIPTION OF THE DRAWINGS

The present disclosure is described in conjunction with the appended figures.

DETAILED DESCRIPTION

Figure 1:
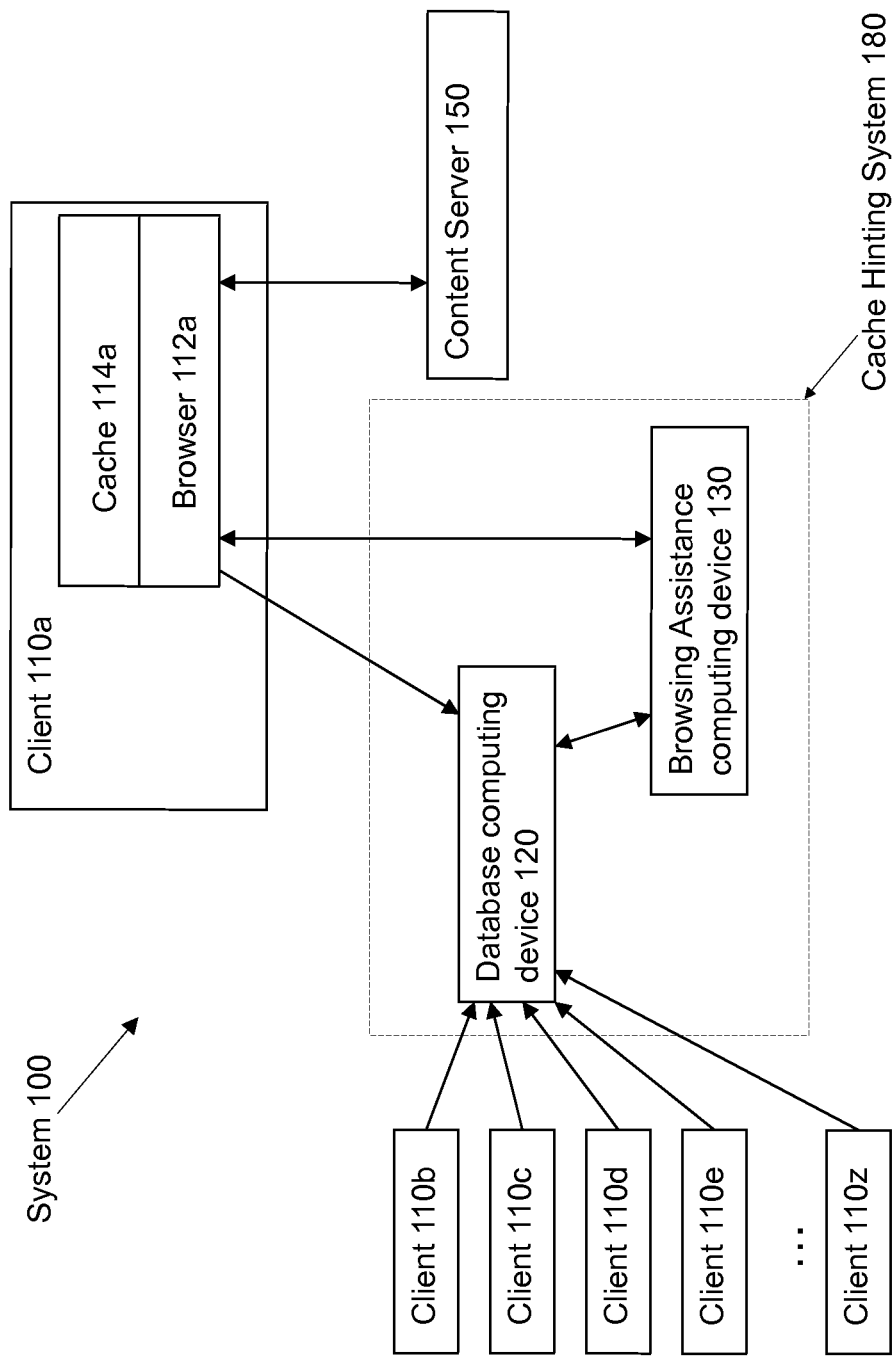
FIG. 1 illustrates a block diagram of one potential implementation of a communications system in accordance with one potential embodiment of the innovations presented herein.

The present invention relates, in general, to network acceleration and, more particularly, to the use of a cache hinting system to improve page load time and reduce system resource usage. In certain embodiments, they may be done with system-wide tracking of objects used in a web page to supplement a system's ability to use cached objects. In certain embodiments, caching decisions may also be influenced or based upon caching hints as described herein. In various embodiments, user web page transactions are observed to identify object versions. This real user usage data may be integrated into cache hints which are communicated to various devices. Devices may use these cache hints to update the versions of stale cached objects. For expired or stale objects that have not been revised at the content server, this may enable the real user usage data to provide a basis for extending the freshness of objects in cache.

For example, in certain embodiments, a client device may request hint information from a hinting service when the client device initiates a web page transaction. The hinting service may provide information to the client device that the client device would otherwise not have access to. For cache-related information in particular, the cache hint information may have last modified information or other details related to an object version or changes in an object for a particular object that is more up to date than information contained by the client system. The client system may then make decisions on the use of cached objects based on the hint information before similar information may be received from a content server.

As part of such functionality, a cache hinting system may include a browsing assistance computing device that receives web page transaction information from a large number of client devices or from proxy devices that observe web page transactions. This information may include details of web page requests and responses for objects downloaded to the client devices. The hinting service will thus be receiving a regular stream of updates via hypertext transport protocol (HTTP) cache headers for web objects that are being downloaded by various users.

The web page transaction information from cache headers and other sources may include details related to specific objects which are part of these web page transactions, such as last modified times, object sizes, checksum object identifiers, entity tags (ETags), a maximum age, custom object expiration models, cache-control mechanisms with explicit caching directives, cache warnings, user agent warnings, and other such object details. When a hint request is received by the browsing assistance computing device, these details or information inferred from these details may be communicated to the requesting device. Because the browsing assistance computing device may be positioned to respond more quickly to certain client devices, a faster page rendering time may be enabled for certain client devices. Additionally, because of the structure of certain web pages, a client browser may sometimes download an object that is already in a client cache. The use of cache hint information may enable a client system to use objects from cache that would otherwise be ignored in such embodiments.

As described herein, "object freshness" or "object staleness" refers to caching instructions associated with a version of an object that indicate whether an object is useable in the rendering of a web page at a device. Cached objects may have an associated expiration which indicate a date and time or a duration after download that the object is usable. Such expirations may be set by a content provider to require a check with the content provider for a newer version of the object. Objects in cache which have an expiration later than a current time are considered "fresh" or having a "fresh state." Objects which have an expiration that is prior than a current time are considered "stale" or having a "stale state." In certain embodiments, in order to decide whether a response is fresh or stale, the system needs to compare a freshness lifetime of the object to the object's age.

FIG. 1 describes a system architecture which includes a cache hinting system, where a browser operating on a client system or a cache on a client-side proxy or modem may receive assistance with caching. Any HTTP cache or proxy may use such hints, whether on a desktop, modem, deployed transparently in a network or explicitly via proxy settings in the browser. The cache assistance in this system of FIG. 1 is from a third source independent from and outside of the communication path between the client and a content server from which the client is requesting web content. In alternative embodiments described below, this assistance may be provided by a content provider or a server-side proxy system which is in the communication path between the client and the content server.

System 100 includes clients 110a-z, content server 150, and cache hinting system 180. Cache hinting system 180 is shown as comprising browsing assistance computing device 130 and database computing device 120. In various embodiments, cache hinting system 180 may be implemented as a single server computer or as multiple server computers with storage and network/processing functionality separated on different servers as shown in the embodiment of FIG. 1 with browsing assistance computing device 130 and database computing device 120. In still further embodiments, cache hinting system 180 may be implemented as a cloud-based service with distributed networked devices or as a system of virtual devices operating in conjunction with other systems on top of any number of networked computing devices.

The system is shown functioning with a significant number of clients 110a-z. In certain embodiments, a single cache hinting system may receive web transaction information from and provide sets of cache hints to many thousands of clients 110, though in certain other embodiments cache assistance functionality may be implemented with only a single client. In other embodiments, rather than the information used to create cache hints coming directly from clients, they may be taken from one or more proxy devices that observe communications between clients and content devices. Further, in certain embodiments, a single client may operate with the database analysis and hinting functionality all operating from within the client such that the client contains all the elements of the system such as cache hinting system 180. Such a single client system may include data from outside sources, where caching information may be shared in a peer-to-peer fashion with analysis of web transaction information from other clients analyzed at the single client to create cache hints at the single client. All clients in system 100 may operate a browser system or module such as browser 112a operating on client computing device 110a for receiving and rendering web pages on a display of the client 110a. Embodiments of a client 110a may additionally include a cache 114a that stores web objects based on certain criteria that will also be described below. In certain embodiments, this may include browser cache, device cache, or client-side proxy cache.

In various embodiments, different combinations of devices may use the cache hints. For example, in certain embodiments, all client devices or proxy devices providing details used to create cache hints may receive and use the cache hints. In other embodiments, certain client devices or proxy devices may provide details used to create cache hints, but may not use the cache hints. Thus, a user or users of the hints that are inferred from that cache information can be many clients or a single client, or a proxy deployed anywhere in the network or on the desktop.

Content server 150 functions to interact with a client system 100 as part of a web page transaction and operates in a fashion similar to standard content servers that operate in web transaction systems which have only a client and a content server. Database computing device 120 and browsing assistance computing device 130 function together to provide cache hint information to a client system 100.

Figure 2:
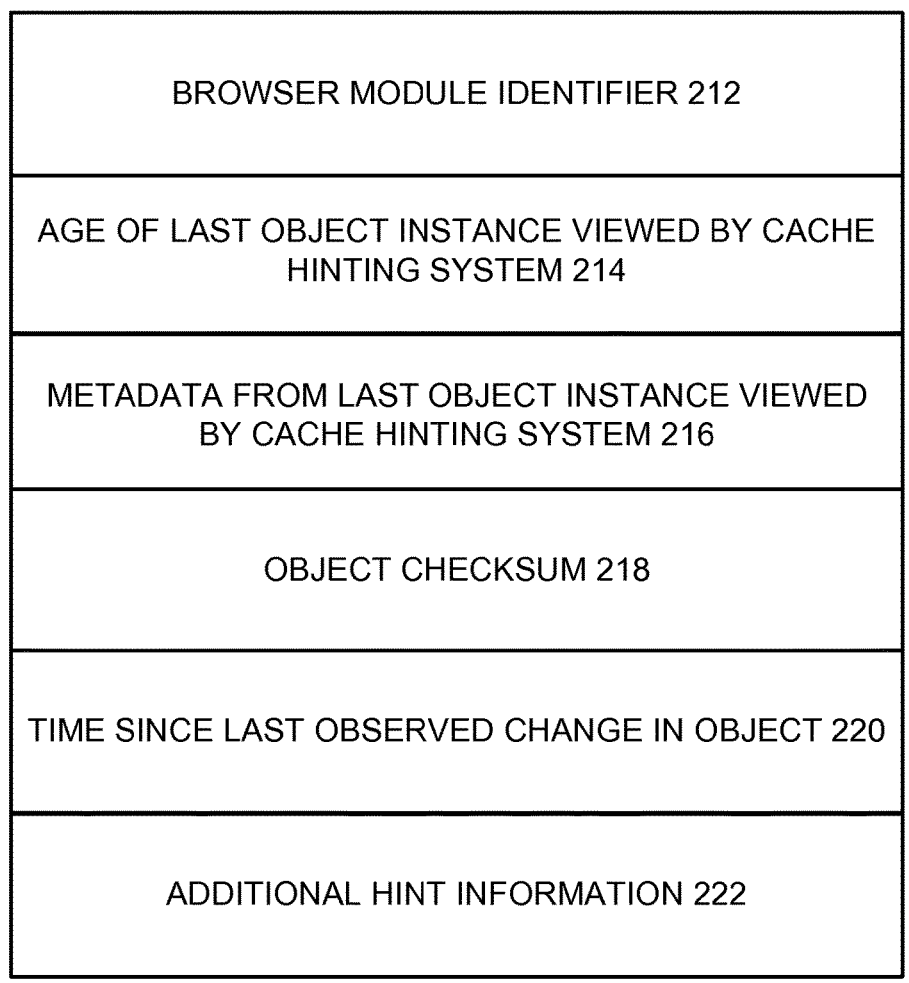
FIG. 2 illustrates aspects of cache hinting and cache hint data according to certain embodiments described herein.

FIG. 2 then describes one potential embodiment of a set of cache hints 200 that may be created by a cache hinting system 180 and provided to clients 110. The set of cache hints 200 in FIG. 2 show cache hint elements for a single object. In certain embodiments, a set of cache hints may include similar details for any number of objects that may be part of a web page transaction associated with a single hint request. For example, when a web browser module or a proxy system identifies an initial root request from a user device to a content server, the web browser module or proxy system may use this identification to further identify an associated complete web page for rendering on the client device. An initial communication from the content server in response to the root request may include a single object that identifies many other objects for the client to request.

Certain embodiments may use manifest files to identify these follow-on child objects to a client device. In certain embodiments, a cache hinting system may include such a manifest file that may provide cache hints not only for the initial root object, but for all child objects that are expected as part of the web page transaction. Thus, a single hint request may receive a response related to dozens of objects and HTTP requests and responses that will be part of the web page transaction initiated by a single user input selecting a web page. In other embodiments, each object may have an associated hint, or groups of objects may have associated hints, as part of a single web page transaction. Each object may have cache elements describing the object in a set of cache hints. Thus, while the set of cache hints 200 includes object checksum 218, other embodiments of a set of cache hints may include forty different object checksums, with associated version or freshness information as well as other identifying information for each object.

Also, in various embodiments, the set of cache hints 200 may be communicated as part of a TCP communication between a client 110 and a cache hinting system 180. In other embodiments, both the hint request and the set of cache hints 200 sent in response to a hint request may be sent as UDP communications. Because the functionality of such cache hints provides a benefit based on the ability of cache hints to arrive at a client 110 prior to related objects or object responses, the use of UDP communications may provide added speed at the cost of reliability. A hinting system using UDP communications or other similar non-reliable communication protocols may simply operate without hint functionality if a UDP communication is missed or dropped as part of the round trip involving the hint request and set of cache hints 200 response. In still other embodiments, protocols other than TCP or UDP may be used during the communication of a set of cache hints.

Regardless of the particular communications protocol used, a set of cache hints may be structured as part of one or more communications including various details related to caching which may be used by a client 110. The set of cache hints 200 illustrated by FIG. 2 includes browser module identifier 212, age of last object instance viewed by cache hinting system 214, metadata from last object instance viewed by cache hinting system 216, object checksum 218, time since last observed change in object 220, and additional hint information 222. These may be referred to as hint elements 212-220 that make up the set of cache hints 200. In various embodiments, any or none of the above hint elements may be used in a particular set of cache hints so long as the set of hint information actually used provides cache hints as described herein. File size may be an additional hint type.

Browser module identifier 212 may identify a particular web browser associated with a hint request and response. Additional details related to such browser modules that may be part of certain cache hinting systems are described below. In other embodiments, an identifier for a particular web browser, a particular client computing device, a particular client-side proxy, or a particular client modem device may be used. In still further embodiments, the system may simply rely on an internet protocol address of the sending device without a separate identifier associated only with the cache hinting system.

Age of last object instance viewed by cache hinting system 214 may simply be a date and time that another client system or proxy server reported observation of a particular object. In certain embodiments, this may be a number of seconds since the cache hinting system 180 last received information on a particular object or last saw a copy of the object sent to a client 110 as a fresh object.

The term "fresh" or "freshness" as used herein relates to a set of rules for use of an object as part of rendering of a web page. An object which is "fresh" meets the rules and may be used for the web page. An object that is not fresh must be verified with the content provider. Similar rules apply for objects of unknown freshness, as the system may need to assume that the objects are not fresh. This may be done either by downloading a new copy, verifying that a time limit provided with the object has not expired, or sending a request to a content server to verify that the object has not changed or that an identifier of the client's copy of the object matches the content provider's current identifier for the object. Such communications may be referred to as If-None-Match or If-Modified-Since object request. These may also be referred to as contingent object requests or cache re-validation requests.

Metadata from last object instance viewed by cache hinting system 216 may be information associated with the object seen at the time identified by hint element 214. In other words, when the cache hinting system 180 sees a copy of an object or receives information from a client 110 that the client received a new copy of the object, the time the object was seen may be recorded as part of hint element 214, and any metadata associated with that particular object may be used as hint element 216. This may include cache headers with caching instructions or any other such information. If new caching instructions are seen by a client system 100 as part of a hint element, these new caching instructions may be adopted for the copy of the object in the client's cache based on the information from the hint element. In one embodiment, this may include a number of seconds that the content server has indicated explicitly via expiration indicators or maximum-age headers that a given object can be considered "fresh" with no need to revalidate against the origin server via an If-Modified-Since request or an If-None-Match request. The HTTP standard also allows this value to be derived heuristically based on the time since last observed change in object 220 and age of last object instance viewed by cache hinting system 214 as long as a warning (such as Warning 113 under the HTTP standard) is included in the response header to inform the browser that the freshness lifetime is not explicit. In certain embodiments, thresholds may be set to determine when an explicit verification of the object is to be made from the content server. For instance, the threshold could be (Age of Last Version/Age of Last Sample)*60 seconds but with a maximum allowable Age of Last Sample of ten minutes. In other embodiments, a maximum allowable Age of Last Sample may be based on a longer revision history, such as the average time between object versions.

Object checksum 218 may be any checksum or hash value that identifies the object. This may be a unique global identification, or may simply be a weak identification with a high probability of distinguishing between different versions of the object. Such a checksum may also be what is found in an ETag header in an HTTP response. Because of the processing resources required to create such identifiers, an object checksum 218 may only be included in certain embodiments when an object is below a threshold size. For sets of cache hints related to multiple objects, this may result in an object checksum hint element for certain objects but not for other objects within the same set of cache hints. With a threshold of five kilobytes, a web transaction with four objects below this threshold and three objects above this threshold may result in a set of cache hints containing four object checksums.

Time since last observed change in object 220 may identify the last observed revision of an object. This may also include other revision metrics, such as a frequency of revision. This information may be used in conjunction with the information related to the last seen current copy of the object from hint element 214. If the last copy of the object seen by the cache hinting system 180 was a new version of the object, then hint element 214 will include the same time information as hint element 220.

Additional hint information 222 may include any additional information relevant to the rendering of the web page at a client 110. In certain embodiments, this may include additional hint information unrelated to caching as part of a broader assistance server set of hints. This may assist not only with caching but with prefetching. Such information may include details related to the structures and dependencies among objects in a web page transaction. It may additionally include information related to histories of object download timing. In certain embodiments, for example, information necessary to identify a particular child object may be identified as being present in a cached first object that is not fresh. In such a circumstance, a client may use the information from a first object in client cache to identify a second object for prefetching or for retrieval from cache even if the first object is not used as part of the rendering of the web page on the client as part of the web page transaction.

Table 1 below describes one particular embodiment where cache hinting is used to optimize web page transactions by intercepting cache validation requests on a client-side of a system before they are communicated, and to intercept unnecessary prefetch actions on a server-side proxy. Thus, in certain embodiments, cache hints may be used at both a client-side device and a server-side device as part of cache hinting for a single web page transaction. The hints used at the client-side device and the server-side device may be the same hints, or may be different hints customized for the application of the device using the hints. Table 1 shows fields that may be attached to objects as part of a set of cache hints in certain embodiments of a hinting service (HS).

obtained from the content server that is the origin source of the object. This prevents confusion with other similar fields from the content server that may be associated with the object in a cache.

The set of cache hints described in Table 1 include the version information of a valid copy of an object that the HS currently sees from user usage data. The first two fields, Date and Max-Age, describe how long the valid copy will last on the server. The next two fields, Last-Modified and ETag, provide a checksum or validator of the valid copy. The last field, Warning, indicates whether the field Max-Age is read directly from RUM, or if it is speculated via some heuristic calculation.

The HS can push these hints to both a server-side device and a client-side device as described above. Cache hints can be used on the client side for at least two purposes in various embodiments. They may be used to intercept any cache validation request from the browser. This interception may be performed by a browser module, a client proxy operating on the same device as the browser, or a separate client proxy device such as a modem. This saves the cost of a full round-trip time to the origin server. Cache hints may also be used on the client side to update a version directly in a browser cache, preventing the need for a cache validation request.

On the server side, a proxy device may include a full account of objects cached on a client device, and may determine whether an intercept of a cache validation request will occur. If so, prefetched data for this object will not be communicated to the client-side device.

In certain embodiments as detailed herein, sets of cache hints may be created and updated by observing user usage data instead of or in addition to the use of any caching information from the origin content server associated with an object. A hinting service may identify objects as they are accessed by users either at a user device, or at a proxy server as the objects are being communicated to and/or from a user device. This identification may include use of a unique value associated with the object, an ETag, a hash value, or any other such object identifier. When the objects are identified, web transaction information may be extracted or inferred based on associated information. For example, a proxy server may parse a communication to identify an object and

TABLE 1

| Field Name | Description | Example |
| --- | --- | --- |
| Date-HS | The date and time the currently valid copy was sent by the origin (content) server, as seen by HS from user usage data | Date-HS: Tue, 15 Nov. 1994 08:12:31 GMT |
| Max-Age-HS | The max amount of time (sec) the currently valid copy can live after Date-HS, as speculated or seen by HS from user usage data. Also shown as the freshness life time. | Max-Age-HS:3600 |
| Last-Modified-HS | The last modified date for the currently valid copy of the object, as seen by HS from user usage data | Last-Modified-HS: Tue, 15 Nov. 1994 12:45:26 +0000 |
| ETag-HS | An identifier for the currently valid copy of the object, as seen by HS from user usage data | ETag-HS: "737060cd8c284d8af7ad3082f209582d" |
| Warning-HS | A general warning about possible problems with the entity body. | Warning-HS: 113 (Max-Age-HS is calculated heuristically) |

The HS suffix identifies the fields as part of a hinting service, and therefore further indicates that the field values are estimated from user usage data instead of being values caching details associated with the object. The caching details are at least a part of the web transaction details for the communication. A database of caching hints may then be accesses to identify a set of caching hints associated with the object. If the web transaction information parsed from the communication is more current than the information reflected in the set of caching hints, the set of caching hints may be updated using the caching details parsed from the communication. These caching details as incorporated into the set of cache hints may then be used to update cached versions of the object in a user device cache or to validate any future cache-validation requests.

In certain circumstances, web transaction information parsed from user usage data may be older than information contained in cache hints. In such a situation, the hinting system may simply ignore the web transaction information. In other embodiments, if the web transaction information conflicts with information in the set of cache hints. A hinting service may operate in such circumstances to contact an origin content server to verify the correct information to associate with an object as part of the set of cache hints. Such communications between the hinting service and the original content server may also be used to create or update cache hints in conjunction with the user usage data derived from user devices and proxy devices.

Figure 3:
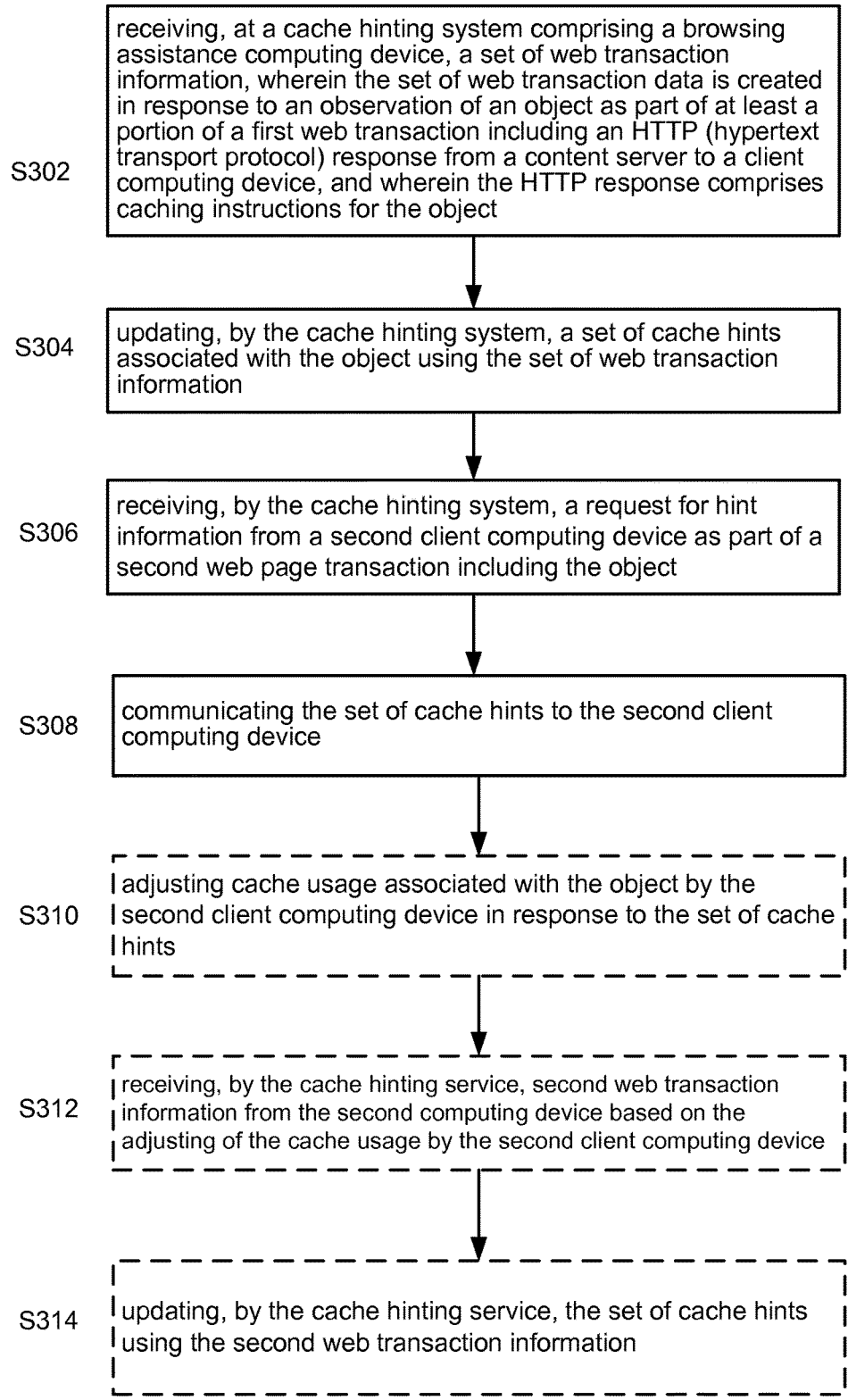
FIG. 3 illustrates one method for implementing cache hinting according to one embodiment.

FIG. 3 then describes one method that may be used with the aspects described in FIGS. 1 and 2. S302 includes receiving, at a cache hinting system comprising a browsing assistance computing device, a set of web transaction information, wherein the set of web transaction data is created in response to an observation of an object as part of at least a portion of a first web transaction including an HTTP response from a content server to a client computing device, and wherein the HTTP response comprises caching instructions for the object. In certain embodiments, this may simply involve receiving a copy of HTTP response headers at the cache hinting system. As described in detail, the computing device that makes up at least a portion of a caching hinting system may receive the web transaction information used to create cache hints from client devices, network proxy devices, or any such resource.

S304 then involves updating, by the cache hinting system, a set of cache hints associated with the object using the set of web transaction information. This process may involve calculating a checksum for the object as observed in the web transaction information, or may involve a comparison with stored checksums if the checksum is received as part of the web transaction information. In certain embodiments, statistical analysis of revision times may be made. In additional embodiments, secondary triggers may be analyzed, such as correlations with other objects that may be expecting a revision if certain other objects are identified as having been revised.

In S306, the method involves receiving, by the cache hinting system, a request for hint information from a second client computing device as part of a second web page transaction including the object. In certain embodiments, this hint request may be from the same device that provided the web transaction information. This may occur if a first device is repeating a web transaction. Because the hint information may include information from numerous other devices and analysis of multiple web transactions, the system may provide benefits in certain embodiments when the first client computing device is the same as the second client computing device. In other embodiments, the second client computing device will be different than the first client computing device, and the second client computing device will not have provided any web transaction information relevant to the object to the cache hinting system. S308 then involves communicating the set of cache hints to the second client computing device.

In S310, after the set of cache hints from S308 is received by the second client computing device, the second client computing device may adjust cache usage associated with the object by the second client computing device in response to the set of cache hints. This may include using the object to render the web page even when the cache information held by the client indicates that the object is not fresh.

In S312, after the web page is rendered on the client, the cache hinting service may receive second web transaction information from the second computing device based on the adjusting of the cache usage by the second client computing device. This may essentially function as feedback to the system to indicate how the set of cache hints was used. Additionally, the client may receive direct communications from a content server after the set of cache hints is received, or may receive this information from a content server before the set of cache hints is received. This feedback may provide information to the cache hinting system on improvements to page rendering times, communication failures, conflicts with a content server communication, or any other such feedback. In S314, this feedback information may be used as part of updating the set of cache hints based on the second web transaction information.

Figure 4:
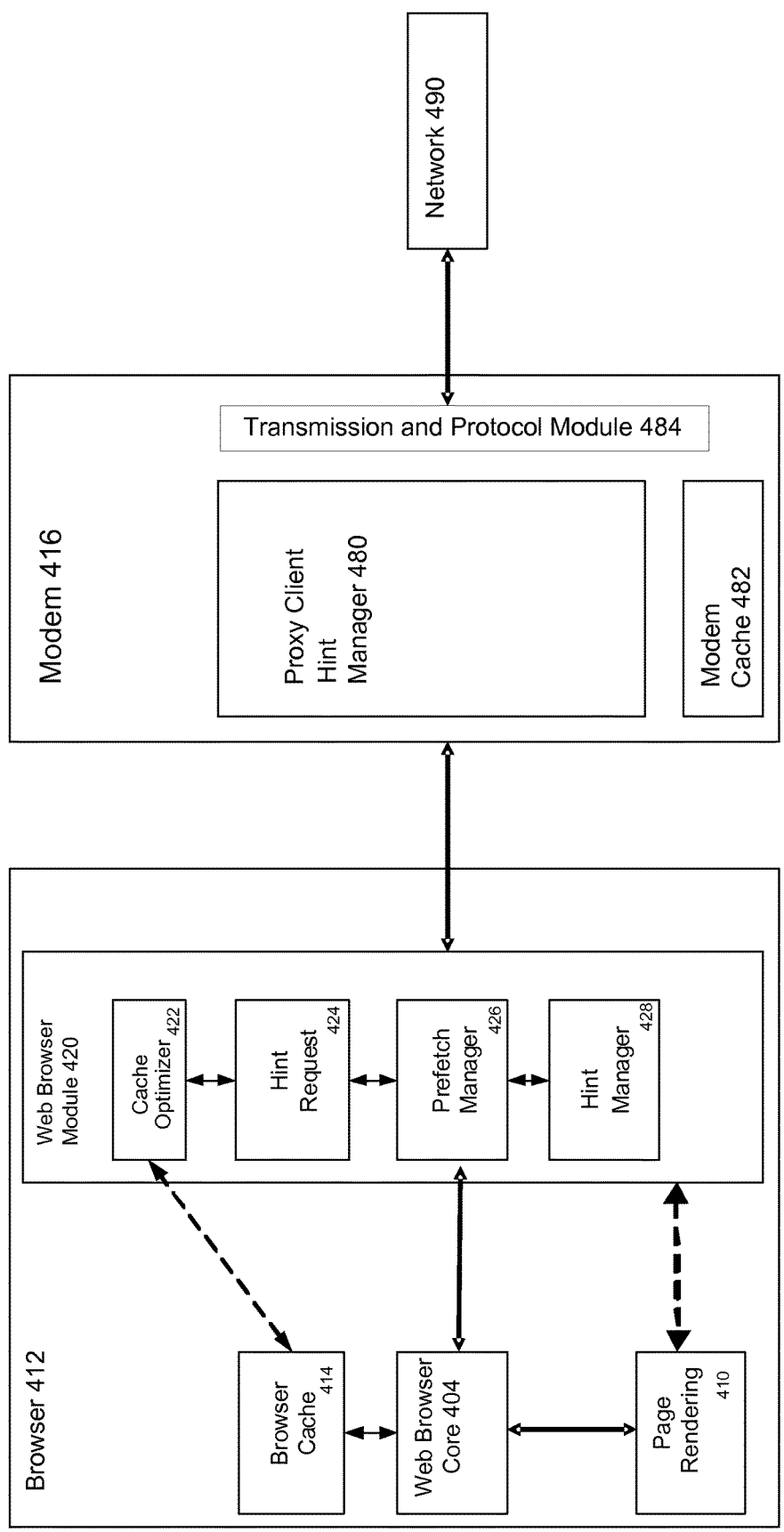
FIG. 4 illustrates a web browser and a user modem that may function as part of a system for cache hinting according to certain embodiments.

FIG. 4 then describes details of a web browser module 420 and a modem 416 coupled to a network 490. Browser module 420 and modem 416 are examples of elements that may be implemented in certain embodiments of a system for web page acceleration using cache hints. In various embodiments, browser module 420 and modem 416 may be implemented on separate devices such that browser 412 is part of a client computing device and modem 416 is part of a separate computing device. In other embodiments, browser 412 and modem 416 may be implemented as part of the same device. In alternate embodiments, any functionality described for browser module 420 may be implemented as a core part of a web browser which is designed to include cache hinting as a core part of the web browser functionality. In other various embodiments, browser module 420 may be a modular plug-in module for an independent browser 412. In still further embodiments, any function or structure described for a web browser module or web browser plug-in may be implemented.

Browser 412 includes various components, shown as browser cache 414, web browser core 404, and page rendering 410. These components may be considered standard components of web browsers. Web browser core 404 operates on a computer processor of a computing device to process user selections and manage basic retrieval of an object from a content server by sending requests and then parsing and processing responses to enable page rendering 410 to create a complete web page for presentation on an output of a device. Browser cache 414 may include structured memory on a device which is used by the browser 412 to store and access objects which have previously been downloaded from network 490 and which may be used again in the future for page rendering 410. When an object is downloaded via network 490 and processed by web browser core 404, caching instructions from a content server that are associated with the object may be identified. This may include instructions indicating the object should not be cached, or may indicate an amount of time before the system should check to see if the object has been replaced or updated.

Browser 412 may use these caching instructions to make determinations about what objects should be stored in cache. Ideally, a system would store all fresh cacheable objects, but because browser cache is limited, a system may make decisions about which objects to cache. Web browser core 404 may include a set of basic caching instructions based on the caching header identified as part of an HTTP response parsed by web browser core 404. In systems with cache hinting, certain devices may include a browser module 420 or similar modules which may improve on the functionality of web browser core 404.

Browser module 420 includes cache optimizer 422, hint request 424, prefetch manager 426, and hint manager 428. In certain embodiments, browser module 420 may essentially act as a transparent proxy, intercepting requests for objects issued by web browser core 404 and intercepting responses from a content server over network 490. As part of this interception, hints may be processes by hint request 424 and hint manager 428. The hint information received may be used by cache optimizer 422 and prefetch manager 426 to improve the function of other parts of the browser 412. In particular, cache hints received and processed by hint manager 428 may be identified and used for cache optimizer 422 to influence the content and use of objects in browser cache 414. In particular, after a freshness timing associated with an object expires, hint manager 428 may receive hint information indicating that the object is still fresh. Cache optimizer 422 may use this information to keep the object in browser cache 414 and communicate to the web browser core 404 that the object is usable due to indirect freshness information from a source other than the content server. In addition to managing browser cache, caching hints may be used to identify objects which may be in cache but which do not have associated hint information to enable the object to be used. Cache hints may identify those objects for prefetching. Finally, cache hints may identify caching priority information based on the impact of caching certain objects on page rendering times. Such page rendering information may be monitored by a browser module 420 in many different devices, and cache hint information may be created and communicated to a cache hint system to provide hints related to the impact on page rendering times for keeping a particular object in browser cache or other system cache. In certain embodiments, cache hints can control the cache replacement policy for a device, cache, CDN, or any other such structure. In other embodiments, hints may be used as one factor in control of such structures. One embodiment of a browser module is described here, but many different structures may be used as part of such a module.

In certain embodiments, cache hints may also be applied to objects that are identified as non-cacheable. For example, if an object is stored in memory temporarily as part of a web page transaction or other action involving the object, and a device receives hints that indicate that the version of the non-cacheable object has not changed, these hints may be used to extend the amount of time that the device will keep the object for re-use from the temporary memory. In certain embodiments, a hint may be used to extend the timing of temporary storage of an object as if the hint were a subsequent download of the non-cacheable object. In other embodiments, the hint may be used to extend the timing of temporary storage of an object as if a third party download of the object which was used to create the hint was a subsequent download of the non-cacheable object to the device receiving the hint request. Due to the short time frames associated with such non-cacheable objects, such hints may particularly provide value when the hint is created on a proxy server embodiment described above, where the proxy server is already in communication with the client devices involved in creating and receiving the hint.

The embodiment of FIG. 4 also includes a modem 416. This may be structured as a hardware module of a client computing device, as a software module executed on a single processor which is also executing browser 412, or may also be implemented as a device separate from the client computing device operating browser 412. Modem 416, in certain embodiments, may also be connected to multiple client computing devices, or multiple browsers similar to browser 412. For example, a single modem in a house may provide the described functionality for each desktop, laptop, smartphone, tablet, phablet, smart appliance, and any other client computing device within a single network. In other embodiments, combinations of browsers on one or more devices may operate with multiple modems as part of a single network. The example modem 416 of FIG. 4 includes proxy client hint manager 480, modem cache 482, and transmission and protocol module 484. Similar to the browser module 420, modem 416 may operate as a transparent proxy but without the direct access to user input information that is available within browser 412. Modem 416 may, however, include additional modem cache 482 storage, which may include greater storage space than what is available for browser cache 414. Additionally, modem cache 482 may include copies of objects downloaded by other devices within a network and may therefore have access to additional objects not available within browser cache 414. Cache optimizer 422 may communicate with modem 416 to manage browser cache 414 with information identifying objects within modem cache 482 so that large objects and objects used by other devices will not be stored in browser cache 414 unless there is a particular efficiency gained by having the object in browser cache 414. Proxy client hint manager 480 may additionally use cache hints to identify priority items for caching in modem cache 482. Such priority may be based on a frequency of use, an impact on page rendering times for page rendering 410, an expected bandwidth savings, or any such metric. Proxy client hint manager 480 may also function to optimize connections with one or more content servers across network 490, including the use of CDNs, peer object sources of content, and other such connection management for both hint communications and HTTP object requests and responses. In further embodiments, proxy client hint manager 480 may not only use cache hints to manage browser cache 414 and modem cache 482 in view of each other, but may also further interact with a dynamic CDN to manage or optimize the usage of this local cache. Hint request 424 and hint manager 428 may manage hint grouping or hint requests based on user preferences, interact with prefetch manager 426 for responding to prefetch requests when objects are cached, and may further function to communicate web page transaction information a database once the user system has completed a web page transaction. In additional embodiments, such functions may additionally be merged or structured in different combinations and may further be merged with any additional system functionality. For example, in certain embodiments, processing and analysis of page rendering times, including statistical analysis over time for different web pages, may be performed and communicated to a cache hinting system as web page transaction information for use in generating cache hints or other types of hints.

In further embodiments, browser 412 may comprise a client graphical user interface (GUI) that allows a user to configure performance aspects of the browser 412. For example, the user may adjust privacy settings, content filters, and enable or disable various features used by the system. In particular, the enablement of browser module 420, both to enable cache hint optimizations and to provide web page transaction information to a cache hint service, may be optional.

As described above and in various embodiments illustrated herein, hints may be requests as part of a web page transaction. For example, browser module 420 or proxy client hint manager 480 may identify the initial or root object request that is part of the beginning of a web page transaction. This may identify a hint request from hint request module 424 or proxy client hint manager 480. The hints received in response to the hint request may be used to accelerate both the root response and any subsequent child requests and responses, both through prefetching and through updating the version of stale objects in browser cache 414 and modem cache 482. In alternate embodiments, however, other triggers may be used to initiate a hint request. In certain embodiments, a browser module 420 may identify stale objects in browser cache 414, and initiate a hint request 424 for any stale objects or stale objects that meet certain criteria. Such criteria may include frequency of object use, object size, expected object download time. expected object verification time, and other such criteria. When the set of hints are received, the system may update the version for stale objects that have not changed, where the system has seen a more recent copy of the object with new freshness information. If the hinting system is aware of a new version of the object, the object may be purged from cache, or an updated version of the object may be downloaded to replace the stale version in the cache. Similar triggers based on staleness of objects may be performed for objects in modem cache 482 triggered and managed by proxy client hint manager 480. In other embodiments, the hint system or a proxy server may keep a record of cached objects in browser 412 or modem 416, and a remote device may automatically send cache hints without a request being initiated on the client side. In still further embodiments, periodic cache hints may be requests by a client device or communicated to a client device, with cached objects updated based on the periodic cache hints. In other embodiments, any such trigger may be used to initiate communication of cache hints to a device.

Also, while embodiments herein describe the use of cache hints at client devices such as a device running browser 412 or modem 416, proxy devices on a server side of a system may also use cache hints to manage objects stored at the proxy device. Such systems may operate with an integrated hinting system, or may use separate browsing assistance computing devices that are part of a cache hinting system separate from the proxy device.

Figure 5:
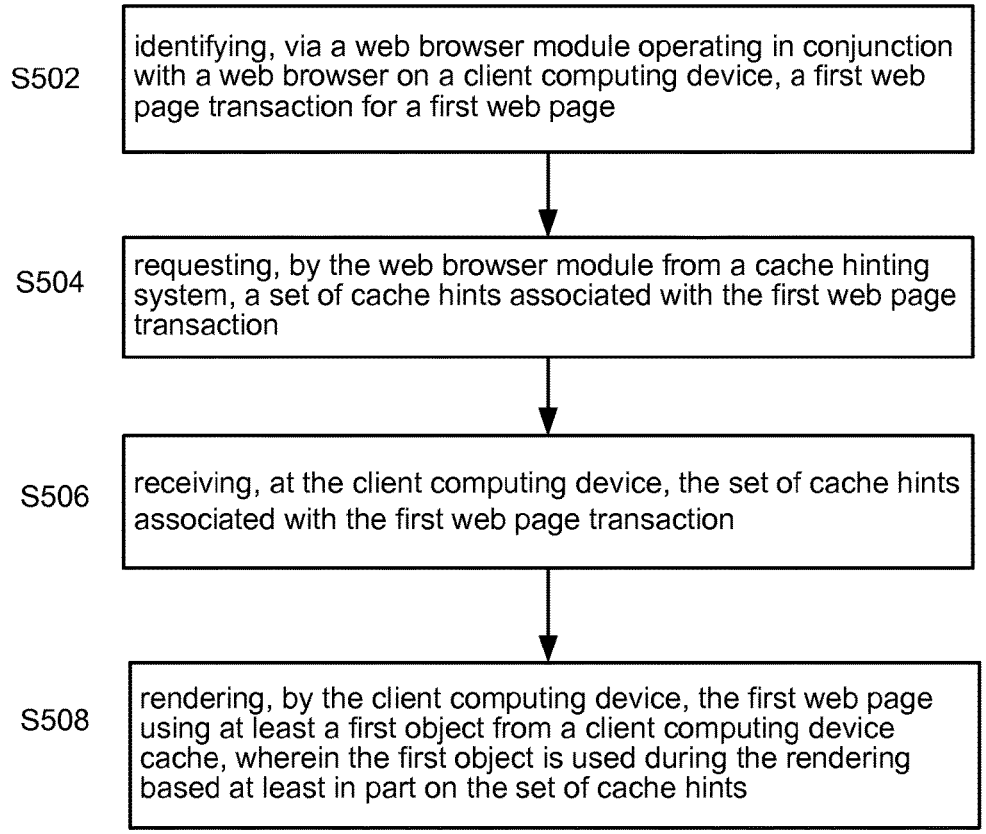
FIG. 5 illustrates one method for implementing cache hinting according to one embodiment.

FIG. 5 then describes one embodiment of a method for use of the elements of FIG. 4. S502 includes identifying, via a web browser module operating in conjunction with a web browser on a client computing device, a first web page transaction for a first web page. The web browser module may be browser module 420 or a different module with different elements. The identification may be a direct identification provided by a web browser core 404 identifying a user selection such as a mouse click, mouse hover on a GUI link, or keyboard entry, or may be made based on a transparent interception of an object request by web browser core 404 as seen by browser module 420.

S504 involves requesting, by the web browser module from a cache hinting system, a set of cache hints associated with the first web page transaction. Such cache hints may be similar to the set of cache hints 200 of FIG. 2, or may include different cache elements than those detailed in the set of cache hints 200. This request may be managed by hint requests 424 operating in conjunction with a proxy client hint manager 480 with a transmission and protocol module 484, or may be managed by any other such module or modules for communication management. S506 involves receiving, at the client computing device, the set of cache hints associated with the first web page transaction. The received hints may be managed as described above by the elements of FIG. 4.

S508 then involves rendering, by the client computing device, the first web page using at least a first object from a client computing device cache, wherein the first object is used during the rendering based at least in part on the set of cache hints. This client computing device cache may be browser cache or a modem cache. The set of cache hints may provide a basis for a use of the first object based on indirect freshness information or cache prioritization that selects the first object for placement in the client computing device cache.

Figure 6:
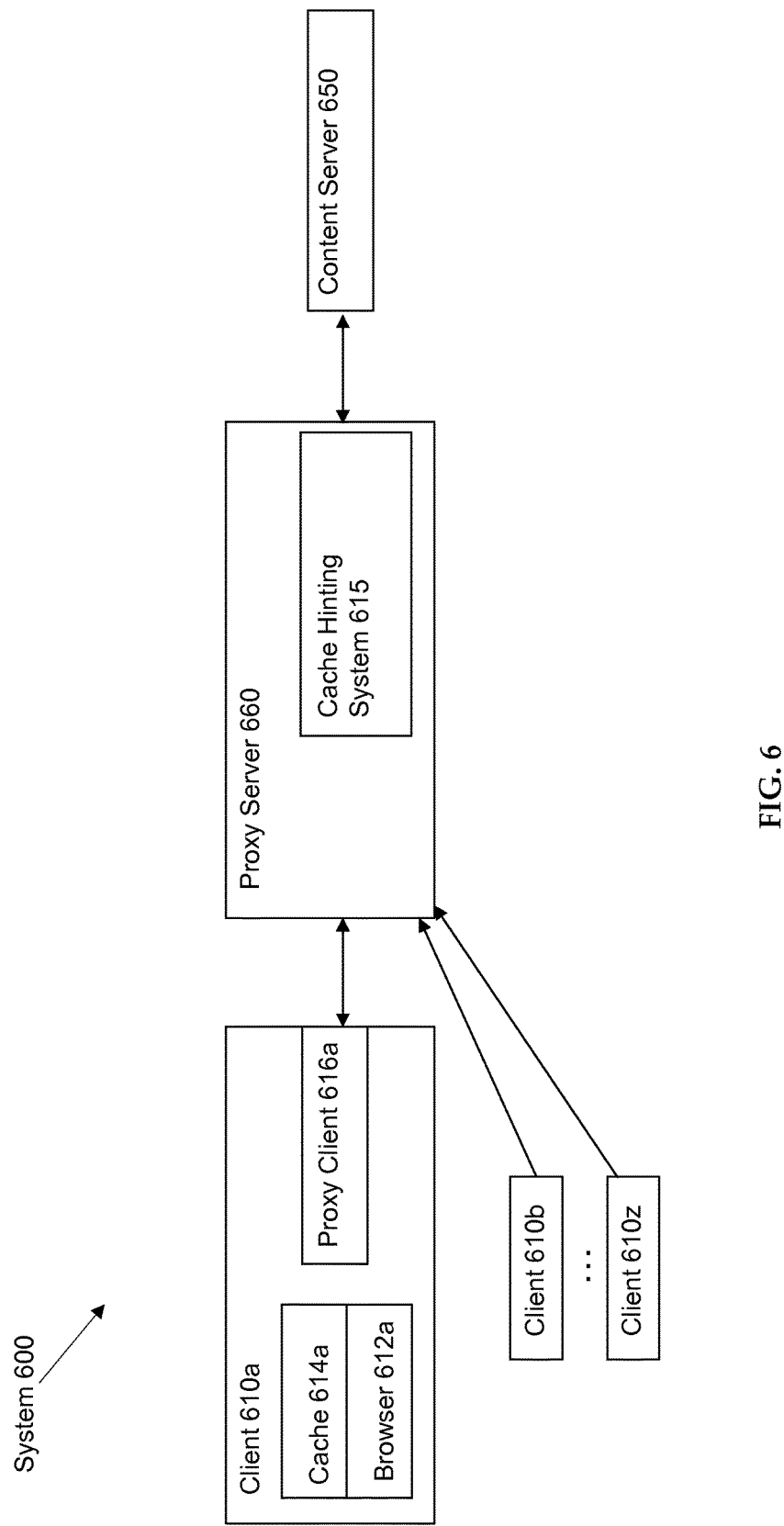
FIG. 6 describes a system for implementing cache hinting as part of proxy server architecture according to certain embodiments.

FIG. 6 then provides an additional embodiment that may be used to implement a cache hinting system. In contrast with the system of FIG. 1 which implements the cache hinting system as a stand-alone system that is not in the communication path between a client and a content server, system 600 implements a cache hinting system 615 on a proxy server 660. Such a proxy server 660 may implement functionality other than cache hinting, such as server-side proxy prefetching, caching, and other server-side communication management.

In such a system, multiple clients 610*a-z* may use proxy server 660 to access a broader network such as the Internet, which contains content servers such as content server 650. Because proxy server 660 may process all traffic for each of the clients 610*a-z*, significant amounts of information related to the caching and prefetching of objects to enable faster page rendering times at each client may be known by proxy server 660 and used by cache hinting system 615 as part of proxy server 660. Cache hinting system 615 may use this information from clients 610*a-z* to create cache hints. Individual clients may then request cache hints. Alternatively, when proxy server 660 sees an initial or root HTTP request from client 610*a* at the beginning of a web page transaction, proxy server 660 may automatically send a set of caching hints to client 610*a* without a specific hint request. Proxy client 616*a* may process the set of hint information from cache hinting system 615 to enable more efficient use of cache 614*a* as part of browser 612*a* functionality, even if browser 612*a* does not include a specialized browser module for cache hints.

Cache hinting system 615 may thus enable use of stale objects from cache 614*a* by sending a set of cache hints to client 610*a* from cache hinting system 615 when a root HTTP request is seen by proxy server 660 instead of waiting for a round-trip communication to return to proxy server 660 from content server 650. This essentially enables freshness information that was sent to a different client but observed by cache hinting system 615 to be used by client 610*a*.

Figure 7:
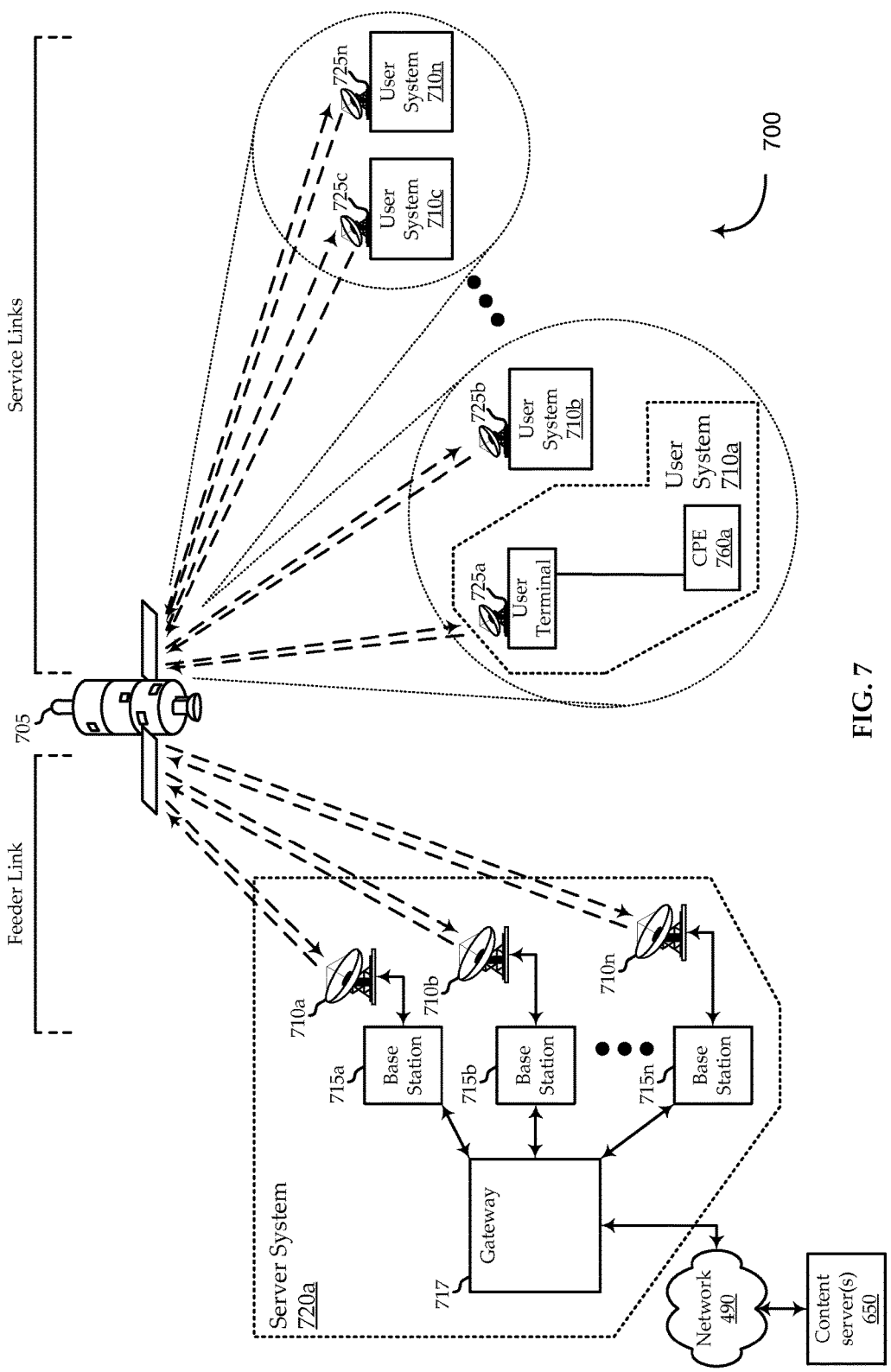
FIG. 7 describes a satellite communication system which may use a cache hinting system for network acceleration according to certain embodiments.

FIG. 7 shows an additional embodiment of a system that may be used to implement cache hints. The system of FIG. 7 shows a block diagram of an embodiment of a satellite communications system 700 having a server system 720*a* in communication with multiple user systems 710*a-n* via a satellite 705 over multiple spot beams, according to various embodiments. The server system 720a may include many server components, including base stations 715a-n, gateway 717, etc.

In such a system, gateway 717 or any other element in a communications pathway between a user device and a content server may implement a cache hinting system as part of a proxy configuration as detailed in FIG. 6. In other embodiments, a cache hinting system may be coupled to system 700 via gateway 717, base station(s) 715, and/or via network 490. The cache hints, which are looked up at the time of a root or click object request, can be pushed to a user terminal 725a-n or a consumer premises equipment (CPE) device 760a of a user system 710, often arriving before the first byte of the root object response since the hinting system latency is so low and because it will be relatively near to the base station 715 or gateway 717 compared to the origin content server(s) 650. As soon as the cache hints do arrive, the user system 710 can use these hints to respond directly to HTTP requests made by a user system 710 from the user system cache.

A base station 715 is sometimes referred to as a hub or ground station. In certain embodiments, the base station 715 has functionality that is the same or different from a gateway 717. For example, as illustrated, a gateway 717 provides an interface between the network 490 and the satellite 705 via a number of base stations 715a-n. Various embodiments provide different types of interfaces between the gateway 717 and base stations 715. For example, the gateway 717 and base stations 715 may be in communication over leased high-bandwidth lines (e.g., raw Ethernet), a virtual private large-area network service (VPLS), an Internet protocol virtual private network (IP VPN), or any other public or private, wired or wireless network. Embodiments of the server system 720a are in communication with one or more content servers 650 via one or more networks 490.

As traffic traverses the satellite communications system 700 in multiple directions, the gateway 717 may be configured to implement multi-directional communications functionality. For example, the gateway 717 may send data to and receive data from the base stations 715. Similarly, the gateway 717 may be configured to receive data and information directed to one or more user systems 710a-n and format the data and information for delivery to the respective destination device via the satellite 705, or receive signals from the satellite 705 (e.g., from one or more user systems 710) directed to a destination in the network 490 and process the received signals for transmission through the network 490.

In various embodiments, one or more of the satellite links are capable of communicating using one or more communication schemes. In various embodiments, the communication schemes may be the same or different for different links. The communication schemes may include different types of coding and modulation combinations. For example, various satellite links may communicate using physical layer transmission modulation and coding techniques using adaptive coding and modulation schemes, etc. The communication schemes may also use one or more different types of multiplexing schemes, including Multi-Frequency Time-Division Multiple Access ("MF-TDMA"), Time-Division Multiple Access ("TDMA"), Frequency Division Multiple Access ("FDMA"), Orthogonal Frequency Division Multiple Access ("OFDMA"), Code Division Multiple Access ("CDMA"), or any number of other schemes.

The satellite 705 may operate in a multi-beam mode, transmitting a number of spot beams, each directed at a different region of the earth. Each spot beam may be associated with one of the user links and used to communicate between the satellite 705 and a large group (e.g., thousands) of user systems 710 (e.g., user terminals 725 within the user systems 710). The signals transmitted from the satellite 705 may be received by one or more user systems 710, via a respective user terminal 725. In some embodiments, some or all of the user systems 710 include one or more user terminals 725 and one or more CPE devices 760a. User terminals 725 may include modems, satellite modems, routers, or any other useful components for handling the user-side communications. Reference to "users" should be construed generally to include any user (e.g., subscriber, consumer, customer, etc.) of services provided over the satellite communications system 700 (e.g., by or through the server system 720a).

In a given spot beam, some or all of the users (e.g., user systems 710) serviced by the spot beam may be capable of receiving all the content traversing the spot beam by virtue of the fact that the satellite communications system 700 employs wireless communications via various antennae (e.g., 710 and 725). However, some of the content may not be intended for receipt by certain customers. As such, the satellite communications system 700 may use various techniques to "direct" content to a user or group of users. For example, the content may be tagged (e.g., using packet header information according to a transmission protocol) with a certain destination identifier (e.g., an IP address), use different modcode points that can be reliably received only by certain user terminals 725, send control information to user systems 710 to direct the user systems 710 to ignore or accept certain communications, etc. Each user system 710 may then be adapted to handle the received data accordingly. For example, content destined for a particular user system 710 may be passed on to its respective CPE 760a, while content not destined for the user system 710 may be ignored. This broadly distributed information may, in some embodiments, be sets of cache hints that may be accepted by a target user system 710 that requested cache hints, in addition to other user systems 710 that did not accept the hints. This hint information may then be used by various systems not only to make decisions about the use of stale cached items for rendering a current page as part of a current web page transaction, but also for determining which objects to keep in cache and which objects to remove from cache. In such an embodiment, the performance of feeder and service links on web page rendering may be important as part of the set of cache hints for timing and freshness of objects cached in user systems 710 due to the relatively high latency of communications over these links operating via satellite 705.

Figure 8:
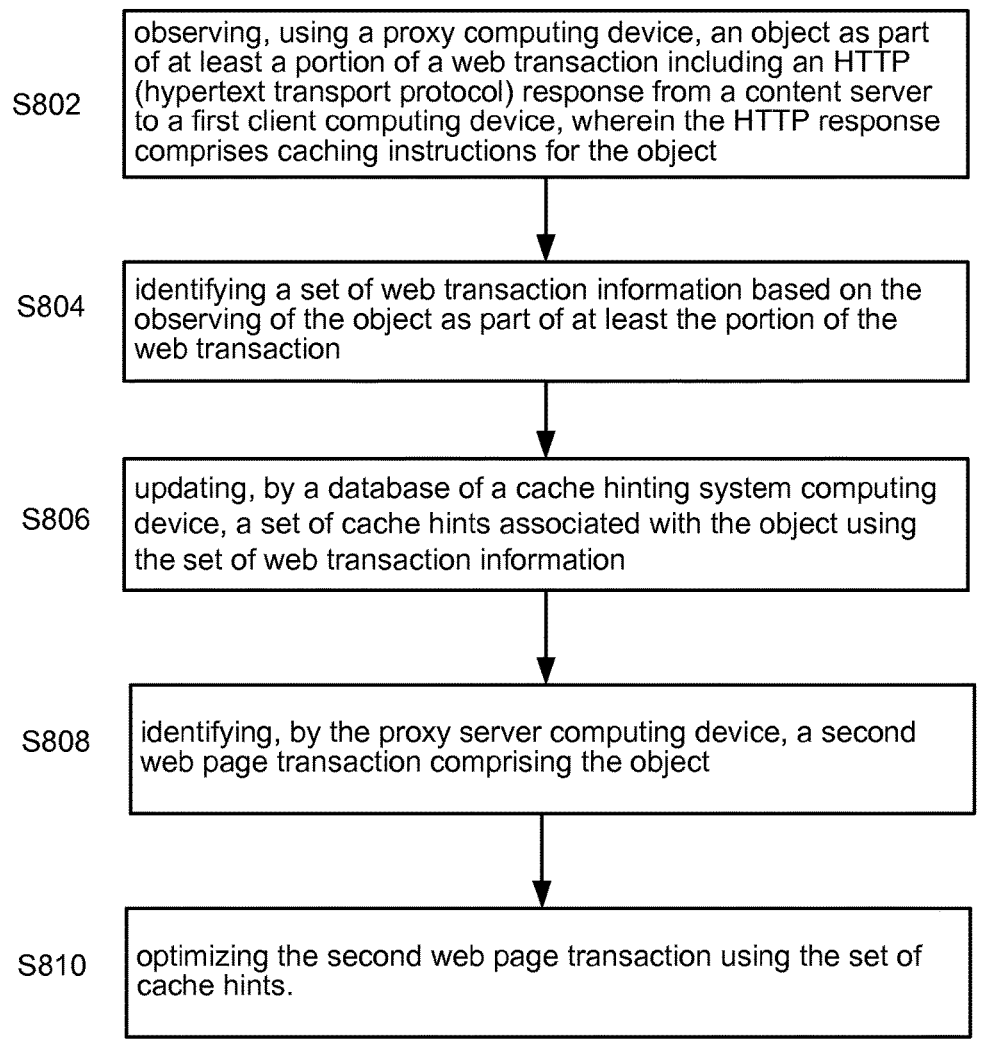
FIG. 8 describes a method for improved prefetching in accordance with one potential embodiment.

FIG. 8 then describes one method of using sets of cache hints as described herein in view of the systems of FIGS. 6 and 7. S802 involves observing, using a proxy computing device, an object as part of at least a portion of a web transaction including an HTTP (hypertext transport protocol) response from a content server to a first client computing device, wherein the HTTP response comprises caching instructions for the object. As an example of such a step, a parser operating on a proxy server 660 or a gateway 717 may parse HTTP requests and responses between a client computing device and a content server 650 to identify the object and/or caching instructions for the object.

S804 involves identifying a set of web transaction information based on the observing of the object as part of at least the portion of the web transaction. This may involve identifying a history of similar web transactions previously seen by the proxy server/gateway system using the identification of the object and/or the caching instructions. This may further involve observing a series of requests and responses that are part of the web transaction involving the object.

S806 then involves updating, by a database of a cache hinting system computing device, a set of cache hints associated with the object using the set of web transaction information. If the object and the associated web transaction had not been previously seen by the cache hinting system, this may involve creation of a new data structure as part of a cache hinting system that includes a set of cache hints for the particular web transaction. If a history already exists for the particular web transaction, statistical characteristics and current states for the web transaction may be updated using the observed details, which constitute the most recent observation of the web page transaction until the next time the same web page transaction is seen by the system.

This information may then be used by the system for later instances of the web page transaction. In S808, the method includes identifying, by the proxy server computing device, a second web page transaction comprising the object, and in S810, the method includes optimizing the second web page transaction using the set of cache hints. While various possible optimizations may be performed using cache hints, the following scenarios would prevent both a round trip across the satellite 705 and conserve the extra bandwidth needed to download the response from the content server 650 in system 700, and would provide similar benefits in the systems of FIGS. 1, 4, and 6.

In the case where the object is in a browser cache on the CPE 760a when CPE 760a is requesting the object as part of a web page transaction, a cache hinting system can respond directly to cache revalidation requests such as If-Modified-Since and If-None-Match requests issued by the browser of CPE 760a based on the cache hints. In such an embodiment, the cache hints do not need to be communicated to the CPE 760a, but can simply be used at the proxy to optimize the web page transaction. So, for instance, if the browser sends an If-Modified-Since request, and If-Modified-Since is the same or newer than the Age of Last Version in the set of cache hints stored in a cache hinting system 615 on a proxy server 660 or on a gateway 717, then the proxy server 660 can reply Not Modified based on the indirect freshness information that is part of the set of cache hints. Likewise, if the browser sends an If-None-Match request and the checksum in the request is the same as the checksum for the corresponding object in the set of cache hints on the proxy, the proxy can reply Not Modified and again save a round trip.

In the case where an object is in the object cache on the user terminal 725a but not in a browser cache of CPE 760a, then the indirect freshness information from the set of cache hints can authoritatively determine whether or not that object is fresh. The object may then be provided to CPE 760a and used for web page rendering in response to both normal HTTP requests that do not include revalidation headers as well as those HTTP requests that do include revalidation headers.

FIGS. 9A-9B and 10A-10B then describe communication flows illustrating the benefits above for a system such as system 100 where the cache hinting system may be a separate system outside of the communication path between a client computing device and a content server. The chart of FIG. 9A includes client computing device browser 912, client proxy/client modem 916, cache hinting system 980, and content server 950. In various embodiments, client computing device browser 912 and client proxy/client modem 916 may be separate devices, while in other embodiments they may be part of the same device. In certain embodiments, client proxy/client modem 916 functionality described in FIGS. 9A and 9B may be implemented in a browser module. In S900 and S902, a web transaction is initiated, and the browser 912 checks for the presence of an object in browser cache. In the hint process including S904, S906, S910, S912, and S914, a set of cache hints is requested and received at a client modem 916. In S916, the object is identified in client modem 916. Because a request for the object was previously seen in S907, in S916, the object may be served from the client modem 916 cache to client computing device browser 912 where the object is received in S918. This process may be essentially transparent to client computing device browser 912, with the exception that certain embodiments may conform with communication standards requiring the object to be served with an indication that the freshness determination was indirect, and not based on a freshness communication directly from the object's content provider. The original request process may continue in parallel in S907, S911, S913, and S915 in order to provide a correct representation of the transaction to content server 950. This process may be repeated for multiple child objects in S919 using the set of cache hints received in S916. S920 through S934 may then involve completion of the web page transaction and communication of feedback to the cache hinting service based on the details of the web page transaction in S900 through S920.

Figure 9A:
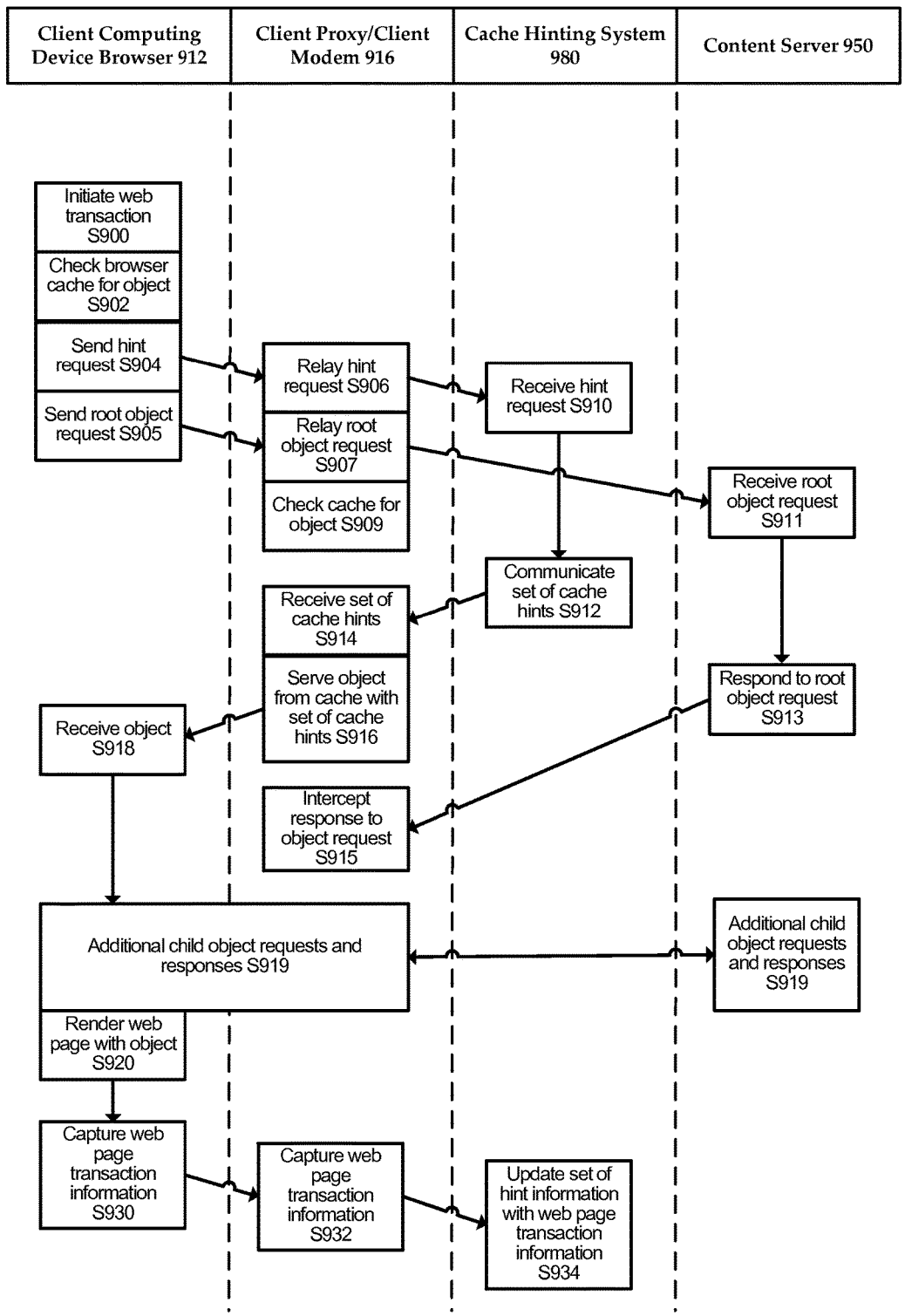
FIG. 9A is a communication flowchart illustrating aspects of a web page transaction according to certain embodiments.
Figure 9B:
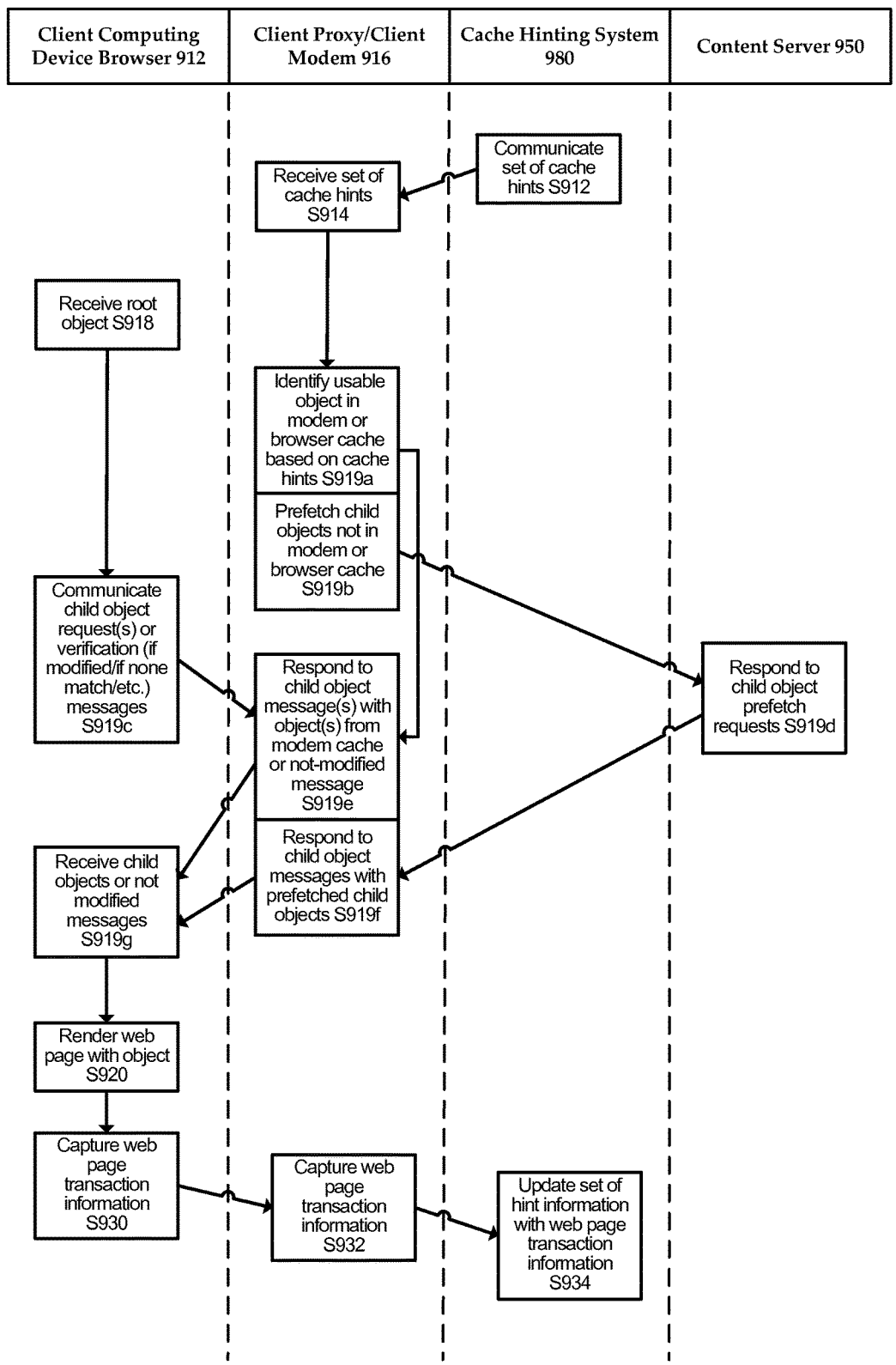
FIG. 9B is a communication flowchart illustrating aspects of a web page transaction according to certain embodiments.

FIG. 9B provides additional details of one implementation of a system that may function as described above in FIG. 9A. FIG. 9B begins with S912, S914, and S918 as described in FIG. 9A. FIG. 9B, however, includes particular details of an implementation of S919 of FIG. 9A as described in S919a-g of FIG. 9B. In S919a, a stale object in a modem memory or a browser cache may be identified as usable based on information received in the set of cache hints from S914. The cache hints are used to update the version of this stale object to identify that is usable based on the user usage data used to create the cache hints. In S919b, objects which are not in the cache or which are stale and not able to be updated using the cache hints may be prefetched. This prefetching process continues in S919d and S919f to provide objects to the client computing device browser 912 in S919g. In S919c, the client computing device browser 912 requests either copies of child objects for objects not stored in browser cache, or requests verification for stale objects in the browser cache. In S919e, the client proxy/client modem 916 is able to respond to child object requests for any child objects that were identified as stale but usable in view of the cache hints in S919a. In S919e, the client proxy/client modem 916 is also able to respond to verification requests based on the cache hints. In S919g, the client computing device browser 912 receives responses from S919e and S919f, and is able to use the objects or verification messages to render the web page in S920. If certain objects are not cached and not prefetched, a direct communication and response from the client computing device browser 912 and the content server 950 may be used to retrieve certain objects as part of the web page transaction. Also, in certain embodiments, S919g may be followed by one or more rounds of dependent child object requests, in which cases the steps of S919c-S919g may repeat for each round of dependent child object requests.

Figure 10A:
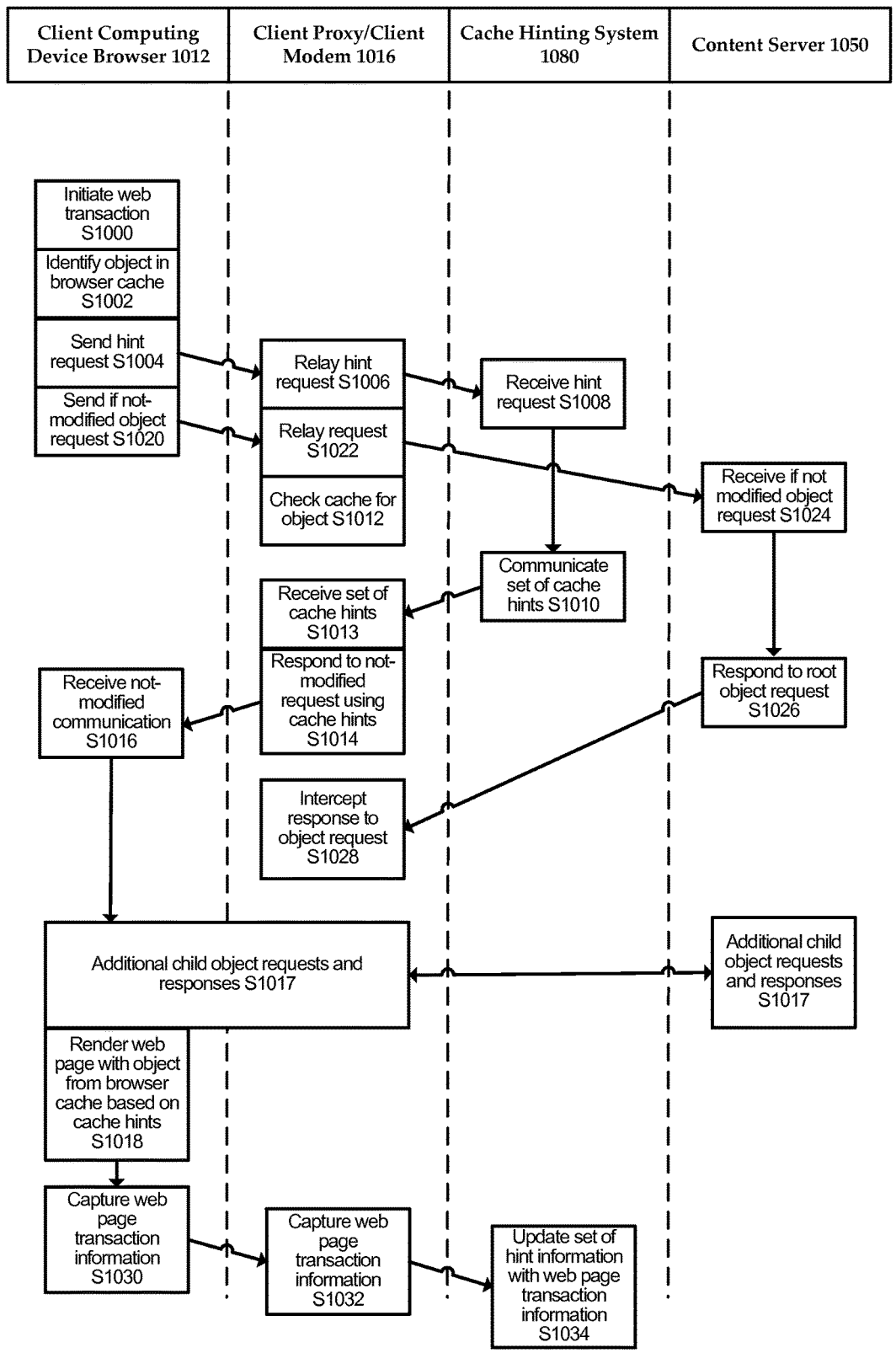
FIG. 10A is a communication flowchart illustrating aspects of a web page transaction according to certain embodiments.

FIG. 10A illustrates a similar set of communications for a Not-Modified response when the object is in the browser cache. FIG. 10A includes client computing device browser 1012, client proxy/client modem 1016, cache hinting system 1080, and content server 1050. Just as in the method of FIG. 9A, in FIG. 10A, the hint and request/response communications proceed in parallel in S1000 through S1028. In S1002, however, the requested object is identified in the browser cache, and an If-None-Match or If-Modified-Since request is sent in S1020. The cache hinting system 1080 responds using indirect freshness information in the form of a set of cache hints in S1010 through S1016, and in S1018, this information based on the set of cache hints is used to render the web page using a stale copy of the object from client computing device browser 1012 which has been indirectly revalidated as fresh using the set of cache hints. Feedback is then sent in S1030 through S1034. While not shown, prior to the feedback, the set of cache hints may be used for any number of objects as part of the web page transaction, including the object identified in S1002.

Figure 10B:
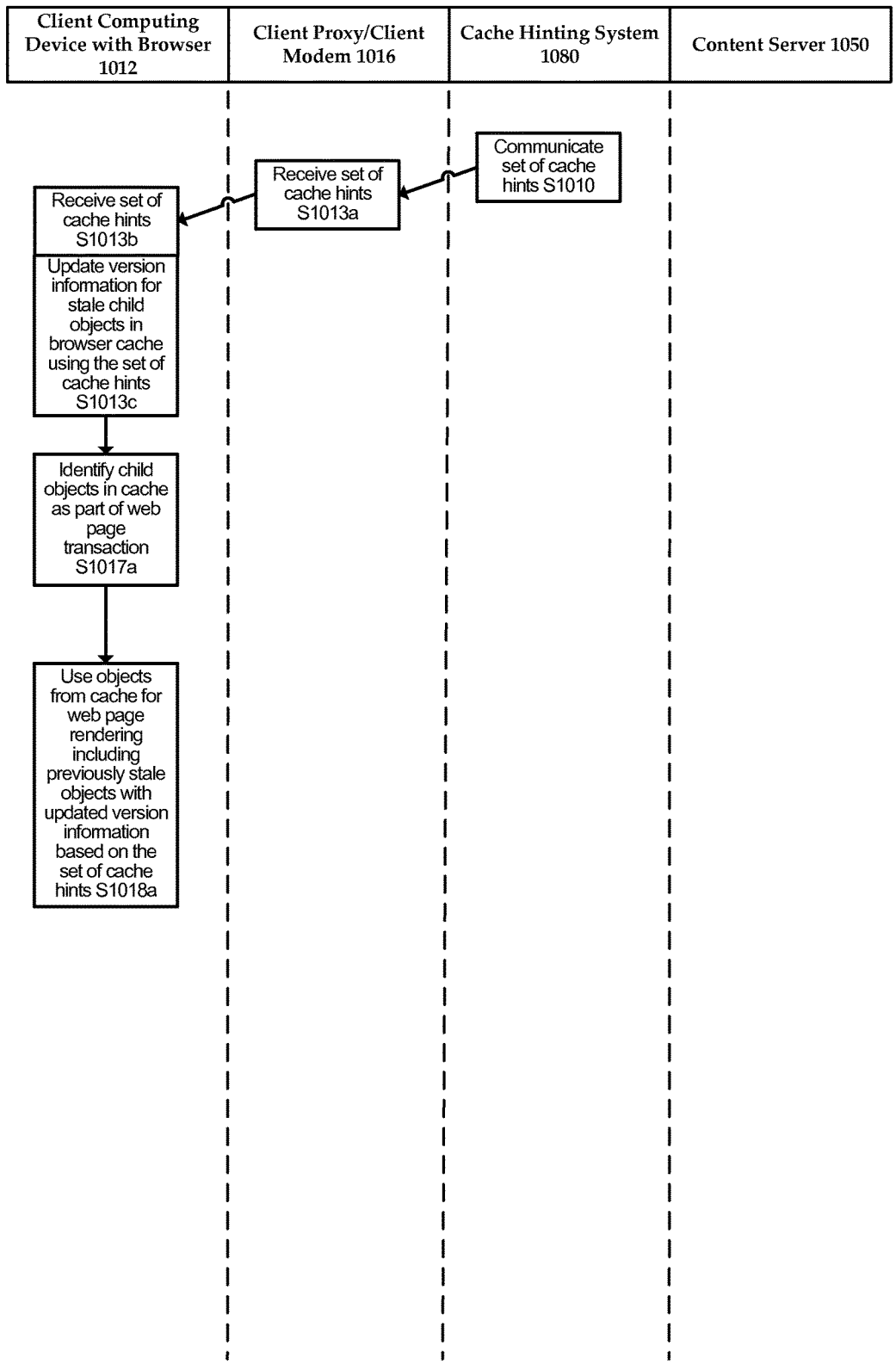
FIG. 10B is a communication flowchart illustrating aspects of a web page transaction according to certain embodiments.

FIG. 10B describes aspects of an additional embodiment where the hint information may simply be used to update the version information of objects stored in a browser cache. As shown in FIG. 10B, the set of cache hints may be received at both client computing device browser 1012 and client proxy/client modem 1016 as shown in S1013a and S1013b. In various embodiments, the set of cache hints may be received at one or more user devices, a client proxy or modem device, a content side proxy device, or any combination of such devices. After the set of cache hints is received at the client computing device in S1013b, the information from the set of cache hints may be used to update version information for stale child objects in the browser cache. As part of this process, the system may either create new cache information similar to the information described in table 1 for objects in the cache. In other embodiments, the system may simply overwrite the existing cache information. For objects in cache that were stale, and that are "fresh" after the update, this enables the use of objects from cache based on the set of cache hints. In S1017a, the child objects for a web page transaction may be identified as part of the standard system operation for a web page transaction. In S1018a, the objects from cache including previously stale objects that had a version updated in S1013c are used in rendering a web page transaction.

Figure 11:
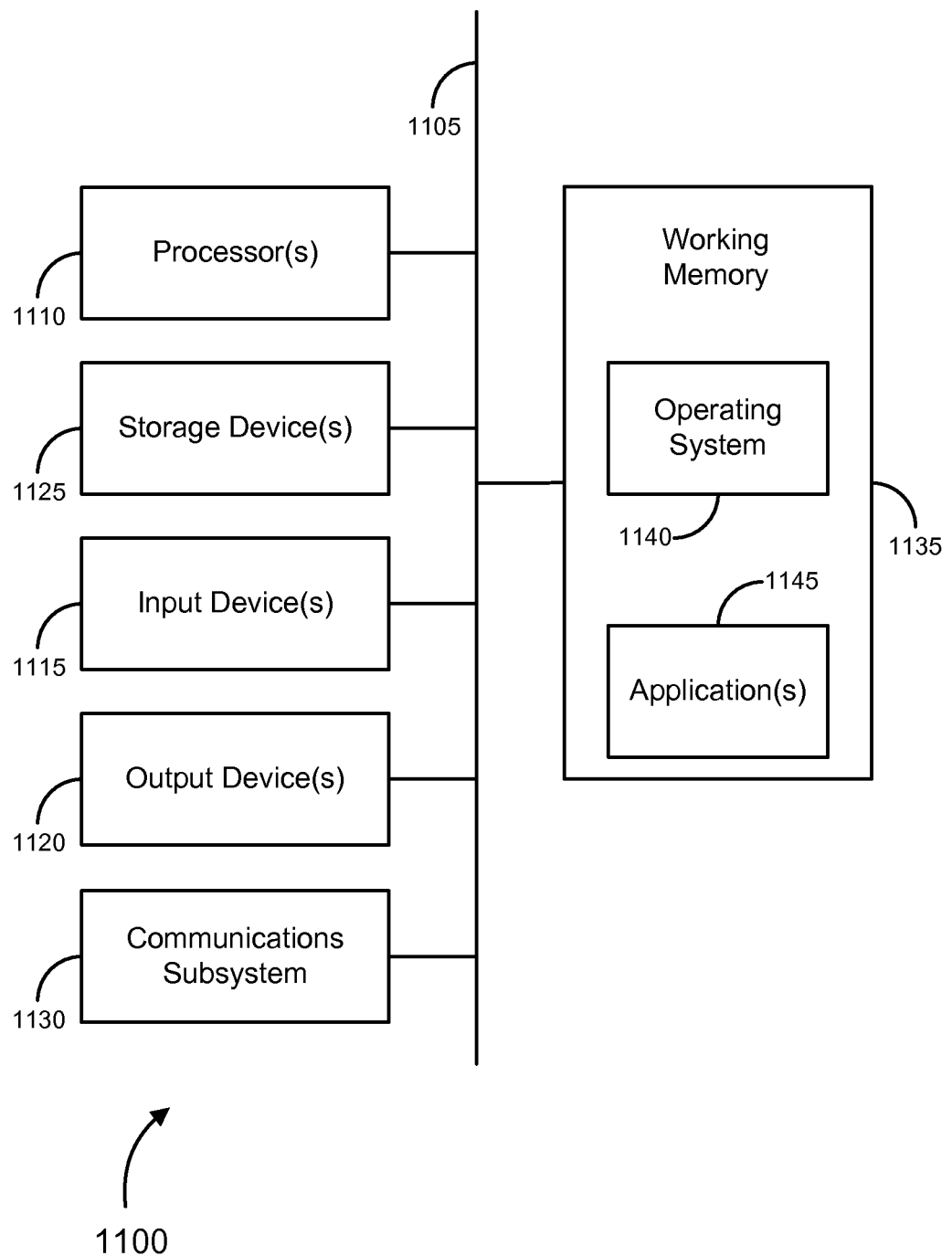
FIG. 11 illustrates a block diagram of one implementation of a computing device that may be used in accordance various embodiments presented herein.

FIG. 11 provides a schematic illustration of one embodiment of a computer system 1100 that can perform the methods related to the use of cache hints as described herein, and/or can function, for example, as any part of client 110, proxy server 660, cache hinting system 180, or any other device described herein. It should be noted that FIG. 11 is meant only to provide a generalized illustration of various components, any or all of which may be utilized, as appropriate. FIG. 11, therefore, broadly illustrates how individual system elements may be implemented in a relatively separated or relatively more integrated manner. In various embodiments, aspects of a computer system 1100 may particularly be used to implement web browser functionality as part of a computing device.

The computer system 1100 is shown comprising hardware elements that can be electrically coupled via a bus 1105 (or may otherwise be in communication, as appropriate). The hardware elements can include one or more processors 1110, including, without limitation, one or more general-purpose processors and/or one or more special-purpose processors (such as digital signal processing chips, graphics acceleration chips, and/or the like); one or more input devices 1115, which can include, without limitation, a mouse, a keyboard, and/or the like; and one or more output devices 1120, which can include, without limitation, a display device, a printer, and/or the like.

The computer system 1100 may further include (and/or be in communication with) one or more storage devices 1125, which can comprise, without limitation, local and/or network accessible storage and/or can include, without limitation, a disk drive, a drive array, an optical storage device, a solid-state storage device such as a random access memory ("RAM") and/or a read-only memory ("ROM"), which can be programmable, flash-updateable, and/or the like. The computer system 1100 might also include a communications subsystem 1130, which can include, without limitation, a modem, a network card (wireless or wired), an infrared communication device, a wireless communication device, and/or chipset (such as a Bluetooth® [1] device, an 802.11 device, a WiFi device, a WiMax device, cellular communication facilities, etc.), and/or the like. The communications subsystem 1130 may permit data to be exchanged with a network (such as the network described below, to name one example), and/or any other devices described herein. In many embodiments, the computer system 1100 will further comprise a working memory 1135, which can include a RAM or ROM device, as described above.

The computer system 1100 also can comprise software elements, shown as being currently located within the working memory 1135, including an operating system 1140 and/or other code, such as one or more applications 1145, which may comprise computer programs of the invention and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer-readable storage medium, such as the storage device(s) 1125 described above. In some cases, the storage medium might be incorporated within a computer system, such as the system 1100. In other embodiments, the storage medium might be separate from a computer system (i.e., a removable medium, such as a compact disc, etc.), and/or provided in an installation package, such that the storage medium can be used to program a general-purpose computer with the instructions/code stored thereon. These instructions might take the form of executable code, which is executable by the computer system 1100, and/or might take the form of source and/or installable code which, upon compilation and/or installation on the computer system 1100 (e.g., using any of a variety of generally available compilers, installation programs, compression/decompression utilities, etc.), then takes the form of executable code. In certain embodiments, this may include web browser functionality and may include separate browser modules as part of this web browser functionality executed by a process to enable display of a web page on an output device 1120 of such a computer system 1100.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 1100) to perform methods of the invention. According to a set of embodiments, some or all of the procedures of such methods are performed by the computer system 1100 in response to processor 1110 executing one or more sequences of one or more instructions (which might be incorporated into the operating system 1140 and/or other code, such as an application 1145) contained in the working memory 1135. Such instructions may be read into the working memory 1135 from another machine-readable medium, such as one or more of the storage device(s) 1125. Merely by way of example, execution of the sequences of instructions contained in the working memory 1135 might cause the processor(s) 1110 to perform one or more procedures of the methods described herein.

The terms "machine-readable medium" and "computer-readable medium", as used herein, refer to any medium that participates in providing data that causes a machine to operate in a specific fashion. In an embodiment implemented using the computer system 1100, various machine-readable media might be involved in providing instructions/code to processor(s) 1110 for execution and/or might be used to store and/or carry such instructions/code (e.g., as signals). In many implementations, a computer-readable medium is a physical and/or tangible storage medium. Such a medium may take many forms including, but not limited to, non-volatile media. Non-volatile media includes, for example, optical or magnetic disks, such as the storage device(s) 1125.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 1110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1100. These signals, which might be in the form of electromagnetic signals, acoustic signals, optical signals, and/or the like, are all examples of carrier waves on which instructions can be encoded, in accordance with various embodiments of the invention. Sets of cache instructions may additionally be examples of such signals as they are communicated to a client computing device. Once received at a client computing device, the information in the signals may be used to store a set of cache instructions in non-transitory memory of a device, or may use the sets of cache instructions as part of a process implemented by a processor to render a web page on a device.

The communications subsystem 1130 (and/or components thereof) generally will receive the signals, and the bus 1105 might then carry the signals (and/or the data, instructions, etc., carried by the signals) to the working memory 1135, from which the processor(s) 1110 retrieves and executes the instructions. The instructions received by the working memory 1135 may optionally be stored on a storage device 1125 either before or after execution by the processor(s) 1110.

Figure 12:
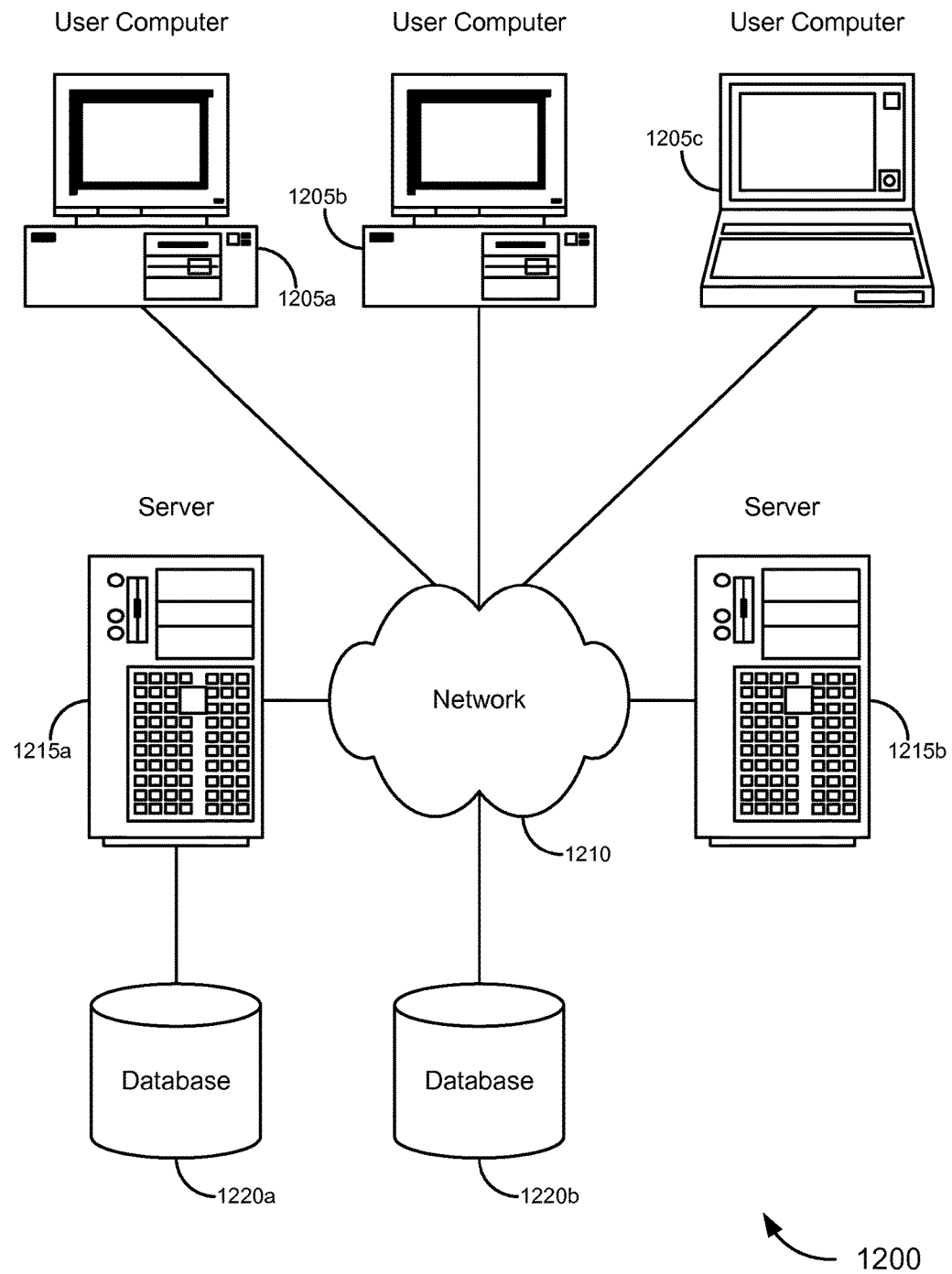
FIG. 12 illustrates a block diagram of one implementation of a communications system that may be used with different aspects of various embodiments presented herein.

A set of embodiments comprises systems for implementing improved web page rendering and improved network resource usage based on the creation and use of sets of cache hints. In certain embodiments, proxy servers, client devices, gateways, satellites, and other such devices as detailed in the figures may be implemented as computer system 1100 in FIG. 11. FIG. 12 illustrates a schematic diagram of a network system 1200 that can be used in accordance with one set of embodiments. In such embodiments, the network system 1200 may represent any number of client and server devices that enable content to be communicated from content providers to user systems as part of web page transactions across a network. The system 1200 can include one or more user computers 1205. The user computers 1205 can be general-purpose personal computers. These user computers 1205 can also have any of a variety of applications, including one or more applications configured to perform methods of the invention, as well as one or more office applications, database client and/or server applications, and web browser applications. Alternatively, the user computers 1205 can be any other electronic device, such as a thin-client computer, Internet-enabled mobile telephone, tablet computer, phablet, wearable device, Internet-enabled appliance, and/or personal digital assistant (PDA), capable of communicating via a network (e.g., the network 1210 described below) and/or displaying and navigating web pages or other types of electronic documents. Although the exemplary system 1200 is shown with three user computers 1205$a$-$c$, any number of user computers can be supported.

Certain embodiments of the invention operate in a networked environment, which can include a network 1210. The network 1210 can be any type of network familiar to those skilled in the art that can support data communications using any of a variety of commercially-available protocols, including, without limitation, TCP/IP, SNA, IPX, and the like. Merely by way of example, the network 1210 can be a local area network ("LAN"), including, without limitation, an Ethernet network, a Token-Ring network and/or the like; a wide-area network (WAN); a virtual network, including, without limitation, a virtual private network ("VPN"); the Internet; an intranet; an extranet; a public switched telephone network ("PSTN"); an infrared network; a wireless network, including, without limitation, a network operating under any of the IEEE 802.11 suite of protocols, or any other wireless protocol; and/or any combination of these and/or other networks.

Embodiments of the invention can include one or more servers 1215. Each of the servers 1215 may be configured with an operating system, including, without limitation, any of those discussed above, as well as any commercially (or freely) available server operating systems. Each of the servers 1215 may also be running one or more applications, which can be configured to provide services to one or more user computers 1205 and/or other servers 1215.

Merely by way of example, one of the servers 1215 may be a web server, which can be used, merely by way of example, to process requests for web pages or other electronic documents from user computers 1205. The web server can also run a variety of server applications, including HTTP servers, FTP servers, CGI servers, database servers, Java®[2] servers, and the like. In some embodiments of the invention, the web server may be configured to serve web pages that can be operated within a web browser on one or more of the user computers 1205 to perform methods of the invention. In certain embodiments, the servers 1215 may also include CDN devices which provide similar or identical content from an alternate server than the primary content server which is a source for particular objects in a web page transaction.

The servers 1215, in some embodiments, might include one or more application servers, which can include one or more applications accessible by a client running on one or more of the user computers 1205 and/or other servers 1215. Merely by way of example, the server(s) 1215 can be one or more general-purpose computers capable of executing programs or scripts in response to the user computers 1205 and/or other servers 1215, including, without limitation, web applications (which might, in some cases, be configured to perform methods of the invention). Merely by way of example, a web application can be implemented as one or more scripts or programs written in any suitable programming language. The application server(s) can also include database servers which can process requests from clients (including, depending on the configurator, database clients, API clients, web browsers, etc.) running on a user computer 1205 and/or another server 1215. In some embodiments, an application server can create web pages dynamically for displaying the information in accordance with embodiments of the invention, such as information displayed as part of various web browsers discussed herein. Data provided by an application server may be formatted as web pages (comprising HTML, JavaScript® [2], etc., for example) and/or may be forwarded to a user computer 1205 via a web server (as described above, for example). Similarly, a web server might receive web page requests and/or input data from a user computer 1205 and/or forward the web page requests and/or input data to an application server. In some cases, a web server may be integrated with an application server.

In accordance with further embodiments, one or more servers 1215 can function as a file server and/or can include one or more of the files (e.g., application code, data files, etc.) necessary to implement methods of the invention incorporated by an application running on a user computer 1205 and/or another server 1215. Alternatively, as those skilled in the art will appreciate, a file server can include all necessary files, allowing such an application to be invoked remotely by a user computer 1205 and/or server 1215. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 1220. Such databases may include stores of web transaction history and hints derived from this web transaction history. Any supporting details related to creation of such hints may additionally be stored in such a database. The location of the database(s) 1220 is discretionary: merely by way of example, a database 1220a might reside on a storage medium local to (and/or resident in) a server 1215a (and/or a user computer 1205). Alternatively, a database 1220b can be remote from any or all of the computers 1205 or servers 1215a,b, so long as the database 1220b can be in communication with one or more of these (e.g., via the network 1210). In a particular set of embodiments, a database 1220 can reside in a storage-area network ("SAN") familiar to those skilled in the art. (Likewise, any necessary files for performing the functions attributed to the computers 1205 or servers 1215 can be stored locally on the respective computer and/or remotely, as appropriate.) In one set of embodiments, the database 1220 can be a relational database that is adapted to store, update, and retrieve data in response to SQL-formatted commands. The database might be controlled and/or maintained by a database server, as described above, for example.

In any embodiment described herein, any communication, hypertext transport protocol (HTTP) request or response, web page transaction, portion of a web page transaction, or any combination of any communications in whole or in part that may use HTTP may also be implemented using hypertext transport protocol secure (HTTPS.) The use of HTTPS involves encryption and various security measures, and any embodiment described herein may be adapted to implement systems and methods described herein to accommodate the encryption and security associated with HTTPS in a number of ways.

In certain embodiments, proxy devices involved in any communication described herein may be provided with details associated with HTTPS communications in order to enable any proxy device functionality described herein. Such details may be provided by a user device with user consent to enable proxy device or hinting server device interaction with the user's communications. This may enable decryption of HTTPS communication by the proxy to enable any functionality described herein. Such details to enable decryption may also be provided by a content server or content server operator to enable proxy device interaction with the content provider's communications. For aspects of embodiments described herein relating to client-side functionality or web browser functionality, certain embodiments may function with the same implementation described above for proxy devices. This functionality may be used as well with any other server side or content device.

In other embodiments, rather than a proxy decryption of HTTPS communications, a browser on a user device may interact with a proxy device or a hinting server device independent of the original HTTPS communication to provide details of the HTTPS communication to the proxy device or hinting server device. In a user device web browser, this may involve the use of a web browser module, web browser plugin, or web browser with specialized core functionality to observe HTTPS communications before they are encrypted. If needed, the independent communications with the proxy device or hinting server device may then additionally be subject to security similar to the security used for the original HTTPS communication. For embodiments described herein which may involve integration with content provider systems or reverse proxy systems, HTTPS communication received at the content provider system or reverse proxy may be used as part of the embodiments described herein after the HTTPS communication is decrypted by the content provider system or reverse proxy. Thus, any "observing" or "identifying" functionality described herein may be performed with HTTPS communications for client devices, proxy devices, and content provider devices. Similarly, any embodiment described herein may be implemented with other secure connection and communication systems or protocols in addition to HTTPS described above.

Certain embodiments described herein refer to proxy devices or proxy systems. As described herein, proxy devices may be one or more devices operating as part of a system to intercept communications between user devices and content devices. Such proxies may be transparent to the user and content devices, or may be part of a multi-step communication path which is apparent to user and content devices. In certain embodiments, proxy devices may function as part of a forward proxy system, where communications from a group of user devices are all communicated to a broader network (such as the Internet) via the forward proxy system. In alternate embodiments, the proxy devices may function as party of reverse proxy systems, where a reverse proxy system operates as an access path to a number of content server devices. It will be apparent that embodiments described herein as including a proxy will apply to both forward proxy systems reverse proxy systems, and any configuration of a system including a proxy, given appropriate accommodations for the particular system structure.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware, and/or software configurator. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with or without certain features, for ease of description and to illustrate exemplary features, the various components and/or features described herein with respect to a particular embodiment can be substituted, added, and/or subtracted from among other described embodiments unless the context dictates otherwise. Consequently, although the invention has been described with respect to exemplary embodiments, it will be appreciated that the invention is intended to cover all modifications and equivalents within the scope of the following claims.

APPENDIX TO THE SPECIFICATION

[1] The "Bluetooth" word mark and logos are registered trademarks owned by Bluetooth SIG, Inc. Other trademarks and trade names are those of their respective owners.

[2] "Java" and "JavaScript" are registered trademarks of Oracle and/or its affiliates. Other names may be trademarks of their respective owners.

What is claimed is:

1. A method comprising:
 receiving, at a cache hinting system comprising a browsing assistance computing device, a set of web transaction information, wherein the set of web transaction information is created in response to an observation of an object as part of at least a portion of a first web transaction including an HTTP (hypertext transport protocol) response from a content server to a client computing device, and wherein the HTTP response comprises caching instructions for the object;
 updating, by the cache hinting system, a set of cache hints associated with the object using the set of web transaction information;
 receiving, by the cache hinting system, a request for hint information from a second client computing device; and
 communicating the set of cache hints to the second client computing device.

2. The method of claim 1 wherein the request for hint information from the second client computing device is received in response to a second web page transaction including the object.

3. The method of claim 2 wherein the set of web transaction information comprises a cache header.

4. The method of claim 2 wherein the set of cache hints comprises one or more of: an age of a last object instance viewed by the cache hinting system; metadata associated with the last object instance viewed by the cache hinting system; a checksum associated with the object, or a time since a last observed change in the object.

5. The method of claim 4 wherein the set of cache hints further comprises a second checksum for a child object that is different than the object.

6. The method of claim 5 wherein the set of cache hints further comprises an analysis of the impact of caching the object on a load time for a web page associated with the first web transaction.

7. The method of claim 2 wherein the request for hint information from the second client computing device comprises an identifier for a web browser module and wherein the set of cache hints comprises the identifier.

8. The method of claim 2 wherein the request for hint information from the second client computing device is received via a client modem connected to the second client computing device, and wherein the request for hint information comprises a list of objects stored in a cache of the client modem.

9. The method of claim 2 wherein the cache hinting system is a portion of at least a part of a server-side proxy system, and wherein the request for hint information is received with a root request initiating the second web page transaction.

10. The method of claim 9 wherein the set of cache hints comprises an enhanced manifest file for the second web page transaction that includes, for each object identified in the enhanced manifest file, one or more of: an age of a last object instance viewed by the cache hinting system; metadata associated with the last object instance viewed by the cache hinting system; a checksum associated with the object; or a time since a last observed change in the object.

11. The method of claim 1 wherein the request for hint information from the second client computing device is received in response to periodic check for stale objects in a cache of the second client computing device.

12. A cache hinting system comprising:
 a non-transitory computer-readable medium having processor-executable instructions; and
 a processor in communication with the non-transitory computer-readable medium, a content server, and a second client computing device, the processor configured to execute processor-executable instructions to:
  receive a set of web transaction information, wherein the set of web transaction information is created in response to an observation of an object as part of at least a portion of a first web transaction including an HTTP (hypertext transport protocol) response from the content server to a client computing device, and wherein the HTTP response comprises caching instructions for the object;
  update a set of cache hints associated with the object using the set of web transaction information;
  receive a request for hint information from the second client computing device; and communicate the set of cache hints to the second client computing device.

13. The cache hinting system of claim 12 wherein the request for hint information from the second client computing device is received in response to a second web page transaction including the object.

14. The cache hinting system of claim 13 wherein the set of web transaction information comprises a cache header.

15. The cache hinting system of claim 13 wherein the set of cache hints comprises one or more of: an age of a last object instance viewed by the cache hinting system; metadata associated with the last object instance viewed by the cache hinting system; a checksum associated with the object, or a time since a last observed change in the object.

16. The cache hinting system of claim 15 wherein the set of cache hints further comprises a second checksum for a child object that is different than the object.

17. The cache hinting system of claim 16 wherein the set of cache hints further comprises an analysis of the impact of caching the object on a load time for a web page associated with the first web transaction.

18. The cache hinting system of claim 13 wherein the request for hint information from the second client computing device comprises an identifier for a web browser module and wherein the set of cache hints comprises the identifier.

19. The cache hinting system of claim 13 wherein the request for hint information from the second client computing device is received via a client modem connected to the second client computing device, and wherein the request for hint information comprises a list of objects stored in a cache of the client modem.

20. The cache hinting system of claim 13 wherein the cache hinting system is a portion of at least a part of a server-side proxy system, and wherein the request for hint information is received with a root request initiating the second web page transaction.

21. The cache hinting system of claim 20 wherein the set of cache hints comprises an enhanced manifest file for the second web page transaction that includes, for each object identified in the enhanced manifest file, one or more of: an age of a last object instance viewed by the cache hinting system; metadata associated with the last object instance viewed by the cache hinting system; a checksum associated with the object; or a time since a last observed change in the object.

22. The cache hinting system of claim 12 wherein the request for hint information from the second client computing device is received in response to periodic check for stale objects in a cache of the second client computing device.

23. A non-transitory computer readable medium having processor-executable instructions to provide a cache hinting system, the processor-executable instructions configured to cause a processor to:
receive a set of web transaction information, wherein the set of web transaction information is created in response to an observation of an object as part of at least a portion of a first web transaction including an HTTP (hypertext transport protocol) response from a content server to a client computing device, and wherein the HTTP response comprises caching instructions for the object;

update a set of cache hints associated with the object using the set of web transaction information;
receive a request for hint information from a second client computing device; and
communicate the set of cache hints to the second client computing device.

24. The non-transitory computer readable medium of claim 23 wherein the request for hint information from the second client computing device is received in response to a second web page transaction including the object.

25. The non-transitory computer readable medium of claim 23 wherein the set of web transaction information comprises a cache header.

26. The non-transitory computer readable medium of claim 23 wherein the set of cache hints comprises one or more of: an age of a last object instance viewed by the cache hinting system; metadata associated with the last object instance viewed by the cache hinting system; a checksum associated with the object, or a time since a last observed change in the object.

27. The non-transitory computer readable medium of claim 23 wherein the set of cache hints further comprises a second checksum for a child object that is different than the object.

28. The non-transitory computer readable medium of claim 23 wherein the set of cache hints further comprises an analysis of the impact of caching the object on a load time for a web page associated with the first web transaction.

29. The non-transitory computer readable medium of claim 24 wherein the request for hint information from the second client computing device comprises an identifier for a web browser module and wherein the set of cache hints comprises the identifier.

30. The non-transitory computer readable medium of claim 24 wherein the request for hint information from the second client computing device is received via a client modem connected to the second client computing device, and wherein the request for hint information comprises a list of objects stored in a cache of the client modem.

31. The non-transitory computer readable medium of claim 24 wherein the cache hinting system is a portion of at least a part of a server-side proxy system, and wherein the request for hint information is received with a root request initiating the second web page transaction.

32. The non-transitory computer readable medium of claim 31 wherein the set of cache hints comprises an enhanced manifest file for the second web page transaction that includes, for each object identified in the enhanced manifest file, one or more of: an age of a last object instance viewed by the cache hinting system; metadata associated with the last object instance viewed by the cache hinting system; a checksum associated with the object; or a time since a last observed change in the object.

33. The non-transitory computer readable medium of claim 23 wherein the request for hint information from the second client computing device is received in response to periodic check for stale objects in a cache of the second client computing device.

* * * * *